US007999982B2

(12) United States Patent
Endo et al.

(10) Patent No.: US 7,999,982 B2
(45) Date of Patent: Aug. 16, 2011

(54) HOLOGRAM OPTICAL ELEMENT, FABRICATION METHOD THEREOF, AND IMAGE DISPLAY APPARATUS

(75) Inventors: Takeshi Endo, Osaka (JP); Yoshie Shimizu, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 506 days.

(21) Appl. No.: 12/126,105

(22) Filed: May 23, 2008

(65) Prior Publication Data

US 2008/0297866 A1    Dec. 4, 2008

(30) Foreign Application Priority Data

May 31, 2007   (JP) ................ 2007-144643

(51) Int. Cl.
 *G03H 1/00* (2006.01)
 *G02B 5/32* (2006.01)
 *G09G 5/00* (2006.01)
(52) U.S. Cl. ............... 359/13; 359/15; 345/7
(58) Field of Classification Search .......... 359/13, 359/15, 630; 345/7, 8, 9
See application file for complete search history.

(56) References Cited

U.S. PATENT DOCUMENTS

| | | | |
|---|---|---|---|
| 5,847,878 A * | 12/1998 | Togino | 359/630 |
| 7,072,085 B2 | 7/2006 | Ouchi | 349/13 |
| 2006/0120247 A1* | 6/2006 | Noda et al. | 369/112.02 |
| 2007/0019264 A1* | 1/2007 | Tanijiri et al. | 359/15 |

FOREIGN PATENT DOCUMENTS

| | | |
|---|---|---|
| JP | 2001-264682 A | 9/2001 |
| JP | 2004-61731 A | 2/2004 |

* cited by examiner

*Primary Examiner* — Alessandro Amari
(74) *Attorney, Agent, or Firm* — Sidley Austin LLP

(57) ABSTRACT

A volume-phase reflection hologram optical element is fabricated by exposing a hologram photosensitive material to two coherent light beams. One exposure light beam has an axis-asymmetric wavefront, and the other exposure light beam has focus points different in the optical axis direction (Z-direction) between on a plane (ZX-plane) including one of two directions (X- and Y-directions) mutually perpendicular on a sectional plane perpendicular to that light beam and on a plane (YZ-plane) including the other of those two directions. Thus, an image display apparatus is realized in which at the time of reproduction, the component of a predetermined wavelength of the image light diffraction-reflected by the hologram optical element is focused at positions different in the optical axis direction between on the ZX-plane and on the YZ-plane, offering different image viewing characteristics between in the X- and Y-directions.

15 Claims, 14 Drawing Sheets

PLANE INCLUDING
OPTICAL PUPIL

US 7,999,982 B2

HOLOGRAM OPTICAL ELEMENT, FABRICATION METHOD THEREOF, AND IMAGE DISPLAY APPARATUS

This application is based on Japanese Patent Application No. 2007-144643 filed on May 31, 2007, the contents of which are hereby incorporated by reference.

BACKGROUND OF THE INVENTION

1. Field of the Invention

The present invention relates to a hologram optical element fabricated by exposing a hologram photosensitive material to two coherent light beams, to a method of fabricating such a hologram optical element, and to an image display apparatus employing such a hologram optical element.

2. Description of Related Art

Conventionally, there have been proposed various image display apparatuses employing a hologram optical element (hereinafter also referred to as "HOE"). FIG. 14 is an illustrative diagram showing such an image display apparatus in a form with its optical path straightened. In this image display apparatus, the light from a light source 101 is converted into a parallel beam by an illumination lens 102, is then diffused by a diffuser plate 103, then enters a liquid crystal display device (hereinafter also referred to as "LCD") 104, and then emerges therefrom as image light. The image light is then diffracted by a HOE 105 so as to be directed to an optical pupil E. Thus, at the position of the optical pupil E, a viewer can view an image displayed on the LCD 104.

In general, a HOE employed in such an image display apparatus is fabricated by exposing a hologram photosensitive material to two coherent light beams. Specifically, a hologram photosensitive material is irradiated with two light beams each from one of two point light sources disposed on opposite sides of the hologram photosensitive material so that the two light beams interfere with each other; in this way, a HOE having interference fringes is fabricated.

Here, for example according to JP-A-2001-264682, at the time of exposure of a hologram photosensitive material for the fabrication of a HOE, one light source is disposed substantially at the position of the optical pupil at the time of reconstruction. With a HOE fabricated in this way, at the time of reconstruction, when the viewer views the image with no deviation in the pupil position within the optical plane thereof, the direction from which the exposure rays are incident on the hologram photosensitive material at the time of exposure coincides with the direction from which the image is viewed at the time of reconstruction. This allows the viewer to view a satisfactory image with no color unevenness within the viewing angle.

On the other hand, for example according to JP-A-2004-61731, at the time of exposure of a hologram photosensitive material for the fabrication of a HOE, one light source is disposed on the side of the optical pupil at the time of reconstruction opposite from the HOE. With a HOE fabricated in this way, at the time of reconstruction, even when the viewer's pupil deviates within the plane of the optical pupil, depending on the viewing direction, the viewing direction may be close to, or even coincident with, the direction from which the exposure rays are incident on the hologram photosensitive material at the time of exposure. This allows reduction of color unevenness resulting from a deviation in the pupil position.

In recent years, the spread of display devices for displaying the high-definition video of digital broadcast has been picking up pace. Such display devices have a screen with an aspect ratio of 16 (width):9 (height). When a display device with a laterally elongate screen like these is applied to an image display apparatus, at the position of the optical pupil, the viewer is allowed a laterally expanded viewing angle, and this makes color unevenness within the viewing angle more likely. Accordingly, in such an image display apparatus, it is desirable to design characteristics with priority given to the viewing angle with a view to reducing color unevenness in the lateral direction within the viewing angle.

By contrast, in a construction, like that of a head-mounted display (hereinafter also referred to as "HMD"), where an image display apparatus is supported in front of the viewer's eye by a supporting means corresponding to the frame of eyeglasses, while the image display apparatus does not easily move in the lateral (horizontal) direction, it easily moves in the longitudinal (vertical) direction. Accordingly, in an HMD so constructed, it is desirable to design characteristics with priority given to the pupil with a view to reducing color unevenness in the longitudinal direction resulting from a deviation in the position of the viewer's pupil.

Furthermore, in a case where an image display apparatus is used by a plurality of people with different pupil distances (the distance between the right and left eyes), the pupil position varies in the lateral (horizontal) direction from one viewer to another. Thus, on the same principle on which a deviation in the pupil position causes color unevenness, different people recognize colors differently. Accordingly, in a case where use by a plurality of people is assumed, it is desirable to design characteristics with priority given to the pupil distance with a view to reducing the difference among a plurality of people in the recognition of colors in the lateral direction, that is, the direction of the pupil distance.

The foregoing takes up merely a few examples of the characteristics to which priority needs to be given in the lateral and longitudinal directions; in practice, depending on how an image display apparatus is constructed and used, it often occurs that different characteristics need to be given priority in the lateral and longitudinal directions. Thus, it is desirable to design an image display apparatus so that it offers different viewing characteristics in different directions. This leads to enhanced usability.

SUMMARY OF THE INVENTION

The present invention has been made under the background described above, and it is an object of the invention to provide an image display apparatus that affords enhanced usability by offering different viewing characteristics in different directions simultaneously, to provide a hologram optical element employed in such an image display apparatus, and to provide a method of fabricating such a hologram optical element.

According to one aspect of the invention, an image display apparatus comprises: a display device that displays an image; and an enlargement optical system that presents a viewer with an enlarged virtual image of the image displayed by the display device. Here, the enlargement optical system has a volume-phase reflection hologram optical element that diffraction-reflects that image light from the display device to direct it to the viewer's pupil. Moreover, when the axis optically connecting between the center of the display area of the display device and the center of the optical pupil formed by the enlargement optical system is called the optical axis, two directions mutually perpendicular and perpendicular to the optical axis are called the first direction and the second direction respectively, the plane parallel to the optical axis and including the first direction is called the first plane, and the plane parallel to the optical axis and including the second direction is called the second plane, then the component of a predetermined wavelength of the image light diffraction-reflected by the hologram optical element is focused at positions different in the optical axis direction between on the first plane and on the second plane.

According to another aspect of the invention, a method of fabricating a hologram optical element comprises: forming a volume-phase reflection hologram optical element by exposing a hologram photosensitive material to two coherent light beams. Here, one of the two exposure light beams has an axis-asymmetric wavefront, and the other has focus points different in the optical axis direction between on a plane including one of two directions mutually perpendicular on a sectional plane perpendicular to that light beam and on a plane including the other of those two directions.

According to yet another aspect of the invention, a hologram optical element is fabricated by the above-described method according to the invention.

According to still another aspect of the invention, an image display apparatus comprises: a display device that displays an image; and an enlargement optical system that presents a viewer with an enlarged virtual image of the image displayed by the display device. Here, the enlargement optical system comprises a volume-phase reflection hologram optical element that diffraction-reflects image the light from the display device to direct it to the viewer's pupil. Moreover, the hologram optical element is the hologram optical element fabricated by the above-described method according to the invention.

According to the invention, it is possible to realize different viewing characteristics in different directions simultaneously, and thus it is possible to realize an image display apparatus that affords enhanced usability.

BRIEF DESCRIPTION OF THE DRAWINGS

These and other objects and features of the present invention will be apparent from the following detailed description of preferred embodiments thereof taken in conjunction with the accompanying drawings, in which.

DETAILED DESCRIPTION OF PREFERRED EMBODIMENTS

Embodiment 1

An embodiment of the invention will be described below with reference to the relevant drawings.

1. Construction of an HMD

Figure 2:
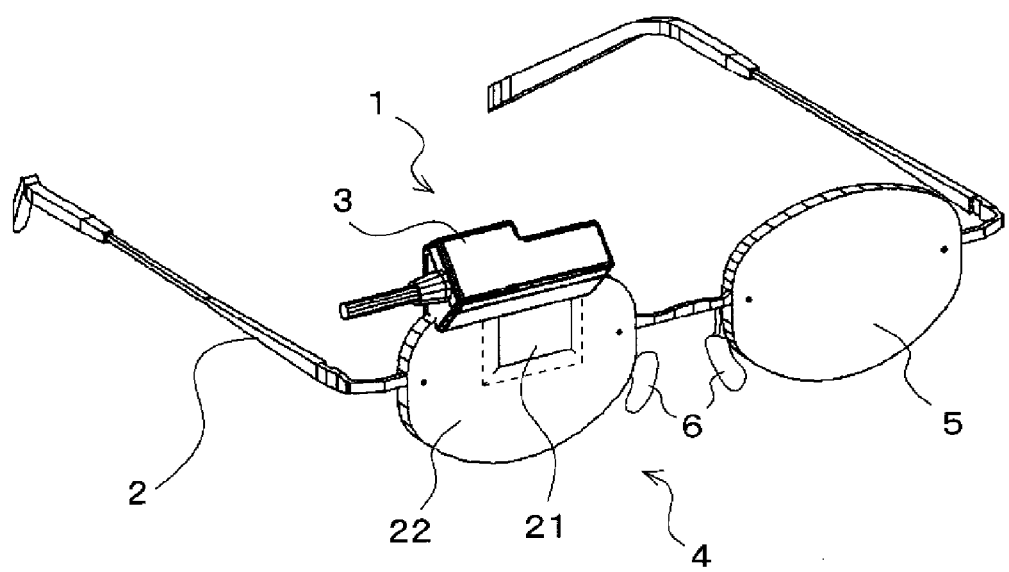
FIG. 2 is a perspective view showing an outline of the construction of an HMD to which the above image display apparatus is applied.

FIG. 2 is a perspective view showing an outline of the construction of an HMD according to this embodiment. The HMD is composed of an image display apparatus 1 and a supporting member 2 (first supporting member).

Figure 3:
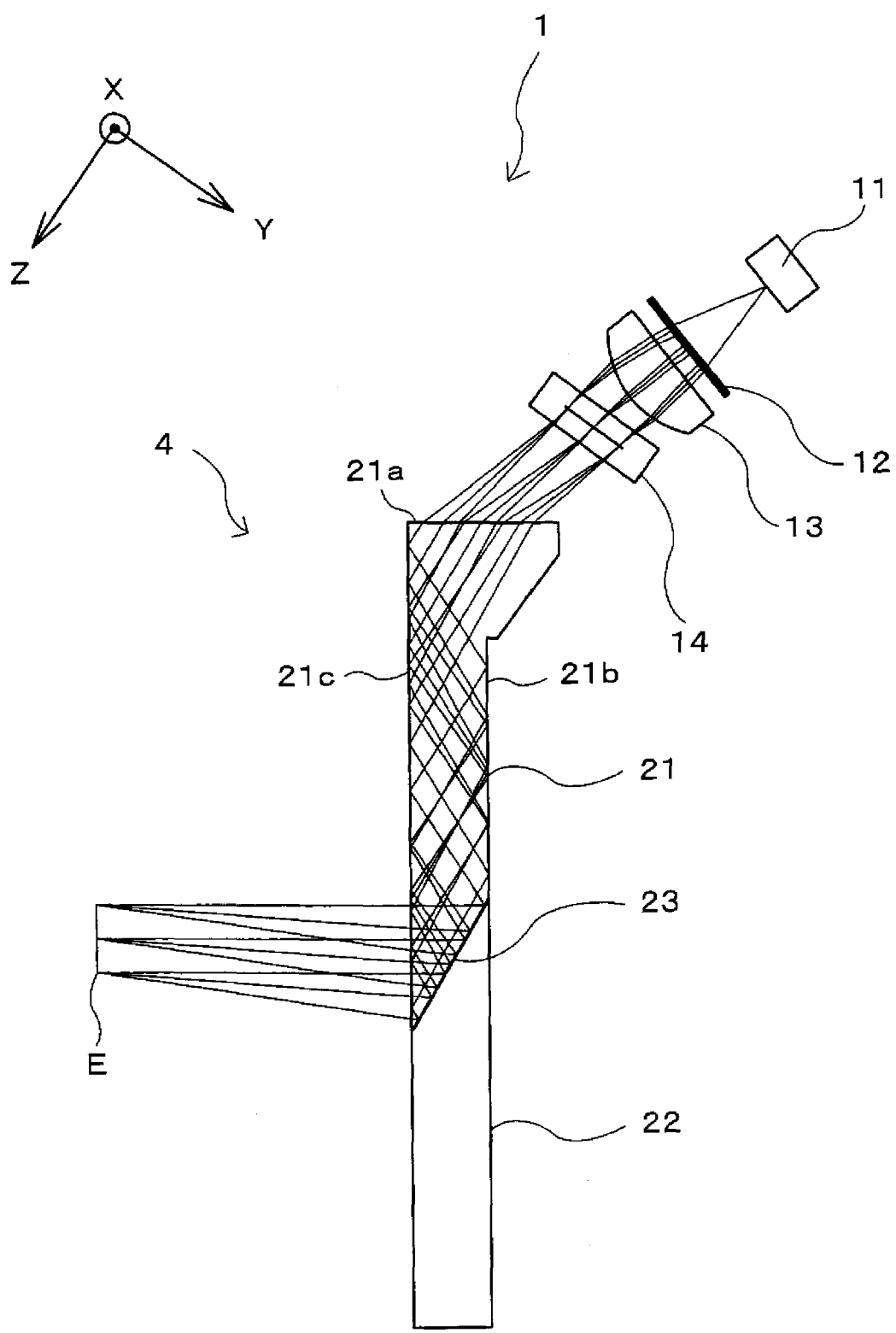
FIG. 3 is a cross-sectional view showing an outline of the construction of the above image display apparatus.

The image display apparatus 1 has a casing 3 that houses at least a light source 11 and a display device 14 (for both, see FIG. 3). The casing 3 holds part of an eyepiece optical system 4. The eyepiece optical system 4 is composed of an eyepiece prism 21 and a deflector prism 22—of which both will be described later—bonded together, and is as a whole shaped like one of the lenses of eyeglasses (in FIG. 2, the one for the right eye). The image display apparatus 1 also has a circuit board (unillustrated) that supplies the light source 11 and the display device 14 with at least driving electric power and an image signal by way of a cable (unillustrated) provided through the casing 3.

The supporting member 2 corresponds to the frame of eyeglasses, and serves as a supporting means for supporting the image display apparatus 1 in front of the viewer's eye while keeping it in contact with a side part of the viewer's head. More specifically, the supporting member 2, on one hand, supports the eyepiece optical system 4 of the image display apparatus 1 in front of one of the viewer's eyes (for example, the right eye) and, on the other hand, supports a dummy lens 5 in front of the other of the viewer's eyes (for example, the left eye). The supporting member 2 also includes right and left nose pads 6.

With the HMD mounted on the viewer's head (with the supporting member 2 held in contact with a side part of the viewer's head, and with the image display apparatus 1 positioned in front of the viewer's eye), when an image is displayed on the display device 14, the image light therefrom is directed through the eyepiece optical system 4 to the viewer's pupil. Thus, the viewer can view a virtual image of the image displayed by the image display apparatus 1. Simultaneously, the user can view an outside-world image on a see-through basis through the eyepiece optical system 4. Two such image display apparatuses 1 may be used to allow the viewing of these images with both eyes (see FIG. 7A).

Moreover, the image display apparatus 1 is supported in front of the viewer's eye by the supporting member 2. Thus, with his hands free, the viewer can do what he wants to with his free hands while viewing the displayed and outside-world images. Now, the image display apparatus 1 will be described in detail.

2. Construction of an Image Display Apparatus

FIG. 3 is a cross-sectional view showing an outline of the construction of the image display apparatus 1. The image display apparatus 1 is composed of a light source 11, a unidirectional diffuser plate 12, a focusing lens 13, a display device 14, and the above-mentioned eyepiece optical system 4. The light source 11, the unidirectional diffuser plate 12, the focusing lens 13, and the display device 14 are housed inside the casing 3 shown in FIG. 2, and also part of the eyepiece prism 21—which will be described later—is placed inside the casing 3. The light source 11, the unidirectional diffuser plate 12, and the focusing lens 13 together constitute an illumination optical system, in which a DOE (diffractive optical element) may be disposed as necessary.

For the sake of convenience, the different directions mentioned in the following description are defined as follows. The axis optically connecting between the center of the display area of the display device 14 and the center of the optical pupil E formed by the eyepiece optical system 4 is called the optical axis. Assuming that the optical path from the light source 11 to the optical pupil E is straightened, the direction of the optical axis is called the Z-direction. The direction perpendicular to the optical-axis-incidence plane of a hologram optical element 23—which will be described later—provided in the eyepiece optical system 4 is called the X-direction, and the direction perpendicular to the ZX-plane is called the Y-direction. Here, the "optical-axis-incidence plane" of the hologram optical element 23 denotes the plane that includes both the optical axis of the light incident on the hologram optical element 23 and the optical axis of the light reflected therefrom, which is to say the YZ-plane. In the following description, the optical-axis-incidence plane is also referred to simply as the "incidence plane". In this embodiment, whether a value is positive or negative is of no significance in any of the X-, Y-, and Z-directions.

When two directions that are both perpendicular to the optical axis and that are mutually perpendicular are called the first and the second direction respectively, in this embodiment, the first direction is, for example, the X-direction and the second direction is, for example, the Y-direction. When the plane that is parallel to the optical axis and that includes the first direction is called the first plane and the plane that is parallel to the optical axis and that includes the second direction is called the second plane, in this embodiment, the first plane is, for example, the ZX-plane and the second plane is, for example, the YZ-plane. At the position of the optical pupil E, the X-direction corresponds to the horizontal direction and the Y-direction corresponds to the vertical direction.

The light source 11 illuminates the display device 14, and is built with, for example, an RGB composite LED that emits light in three wavelength bands of $462 \pm 12$ nm (B (blue) light), $525 \pm 17$ nm (G (green) light), and $635 \pm 11$ nm (R (red) light), as given in terms of the light intensity peak wavelength combined with the half peak light intensity wavelength width. As a result of the light source 11 emitting light in predetermined wavelength widths in this way, the image light obtained by illuminating the display device 14 has predetermined wavelength widths. Thus, when the image light is diffracted by the hologram optical element 23—which will be described later—, at the position of the optical pupil E, the viewer can view the image over the entire viewing angle. The peak wavelengths of the light source 11 for the different colors are set near the peak wavelengths of the diffraction efficiency—which will be described later—of the hologram optical element 23, and this leads to enhanced light use efficiency.

Built with an LED that emits R, G, and B (hereinafter also simply "RGB") light, the light source 11 can be realized inexpensively, and, as it illuminates the display device 14, allows it to display a color image, making it possible to present the viewer with the color image. Moreover, since individual LEDs have narrow light emission wavelengths, using a plurality of them makes it possible to display a bright image with accurate color reproduction.

The unidirectional diffuser plate 12 diffuses the light emitted from the light source 11 at different degrees of diffusion in different directions. More specifically, the unidirectional diffuser plate 12 diffuses the incident light at about 40° in the X-direction and at about 0.5° in the Y-direction.

The focusing lens 13 is built with a cylinder lens that focuses in the Y-direction the light diffused by the unidirectional diffuser plate 12, and is so arranged that the diffused light forms the optical pupil E efficiently.

The display device 14 displays an image by modulating the light emitted from the light source 11 according to image data, and is built with a transmission-type liquid crystal display device that has pixels arrayed in a matrix to form a region that transmits light. The display device 14 is arranged with the longer and shorter sides of its rectangular display area aligned with the X- and Y-directions respectively. The display device 14 may be of a reflection type. Usable as the display device 14 of a reflection type are, for example, a reflection-type liquid crystal device and a DMD (Digital Micromirror Device, manufactured by Texas Instruments Incorporated).

The eyepiece optical system 4 is an enlargement optical system that presents the viewer with an enlarged virtual image of the image displayed by the display device 14, and is composed of an eyepiece prism 21 (first transparent substrate), a deflector prism 22 (second transparent substrate), and a hologram optical element 23.

The eyepiece prism 21, on one hand, totally reflects, between two opposite surfaces 21b and 21c, the image light entering through a surface 21a from the display device 14 to eventually direct the image light via the hologram optical element 23 to the viewer's pupil. The eyepiece prism 21, on the other hand, transmits outside light to direct it to the viewer's pupil. The eyepiece prism 21, and also the deflector prism 22, is formed of, for example, acrylic resin. The eyepiece prism 21 has the shape of a plane-parallel plate of which a bottom-end part is wedge-shaped by being formed increasingly thin toward the bottom end and of which a top-end part is formed increasingly thick toward the top end. The eyepiece prism 21 is joined to the deflector prism 22 with adhesive so as to sandwich the hologram optical element 23 arranged at the bottom end of the former.

The deflector prism 22 is a plane-parallel plate that is substantially U-shaped as seen in a front view (see FIG. 2); when bonded to the eyepiece prism 21 at the bottom end and both sides thereof, the deflector prism 22 and the eyepiece prism 21 together form a substantially plane-parallel plate. Joining the deflector prism 22 to the eyepiece prism 21 helps prevent distortion in the outside world image that the viewer views through the eyepiece optical system 4.

Specifically, if the deflector prism 22 is not joined to the eyepiece prism 21, outside light is refracted when it is transmitted through the wedge-shaped bottom-end part of the eyepiece prism 21, and this produces distortion in the outside image viewed through the eyepiece prism 21. By contrast, when the deflector prism 22 is joined to the eyepiece prism 21 to form an integral substantially plane-parallel plate, the refraction that outside light suffers when transmitted through the wedge-shaped bottom-end part of the eyepiece prism 21 is canceled by the deflector prism 22. This helps prevent distortion in the outside world image viewed on a see-through basis.

The surfaces of the eyepiece prism 21 and the deflector prism 22 may be flat or curved. Giving the eyepiece prism 21 and the deflector prism 22 curved surfaces allows the eyepiece optical system 4 to function as an eyesight correcting lens.

The hologram optical element 23 is a volume-phase reflection hologram that diffraction-reflects the image light (light of wavelengths corresponding to three primary colors) emergent from the display device 14 so that an enlarged image of the image displayed by the display device 14 is, as a virtual image, directed to the viewer's pupil. The hologram optical element 23 is, for example, so fabricated as to diffract (reflect) light in three wavelength bands of 465±5 nm (B (blue) light), 521±5 nm (G (green) light), and 634±5 nm (R (red) light), as given in terms of the diffraction efficiency peak wavelength combined with the half peak diffraction efficiency wavelength width. Here, the diffraction efficiency peak wavelength is the wavelength at which diffraction efficiency is at a peak, and the half peak diffraction efficiency wavelength width is the wavelength width within which diffraction efficiency remains equal to or larger than half the peak of diffraction efficiency.

The reflection hologram optical element 23 exhibits high wavelength selectivity, and thus diffraction-reflects only light in the above wavelength bands (near the exposure wavelengths). Accordingly, the hologram optical element 23 transmits outside light containing wavelengths other than those it diffraction-reflects, and thus exhibits high transmittance to outside light.

Moreover, the hologram optical element 23 has an axisasymmetric positive optical power; that is, the hologram optical element 23 has a function equivalent to that of an aspherical concave mirror having a positive optical power. This increases the flexibility of the arrangement of the individual optical elements constituting the apparatus, thereby making its miniaturization easier, and makes it possible to present the viewer with an image with satisfactorily corrected aberrations.

3. Operation of the Image Display Apparatus

Next, the operation of the image display apparatus 1 constructed as described above will be described. The light emitted from the light source 11 is diffused by the unidirectional diffuser plate 12, is then focused by the focusing lens 13, and then enters the display device 14. The light that has entered the display device 14 is modulated pixel by pixel according to image data, and emerges therefrom as image light. Thus, the display device 14 displays a color image.

The image light from the display device 14 then enters, in the eyepiece optical system 4, the eyepiece prism 21 through the top-end surface (surface 21a) thereof, is then reflected a plurality of times between the two opposite surfaces 21b and 21c, and then strikes the hologram optical element 23. The light that has struck the hologram optical element 23 is reflected thereon, and is then transmitted through the surface 21c, to eventually reach the optical pupil E. At the position of the optical pupil E, the viewer can view an enlarged virtual image of the image displayed by the display device 14.

On the other hand, the eyepiece prism 21, the deflector prism 22, and the hologram optical element 23 transmits almost all outside light; thus, through these, the viewer can view an outside world image. As a result, the virtual image of the image displayed by the display device 14 is viewed in a form superimposed on part of the outside world image.

As described above, in the image display apparatus 1, the image light emergent from the display device 14 is guided by total reflection inside the eyepiece prism 21 so as to be directed via the hologram optical element 23 to the viewer's pupil. This allows the eyepiece prism 21 and the deflector prism 22 to have a thickness of about 3 mm like a common eyeglasses lens, and thus helps make the image display apparatus 1 compact and lightweight. Moreover, the use of the eyepiece prism 21, inside which the image light from the display device 14 is totally reflected, helps secure high transmittance to outside light, and thus makes it possible to present the viewer with a bright outside image.

Moreover, since the volume-phase reflection hologram optical element 23 has narrow half peak diffraction efficiency wavelength widths and thus offers high diffraction efficiency, its use makes it possible to present a bright image with high color purity, and also offers high transmittance to outside light, allowing the viewer to view a bright outside world image. Moreover, its use do not affect the conjugate relationship between the light source 11 and the optical pupil E, and thus do not change the wavelengths of the image light, making it possible to present an image with accurate color reproduction.

Moreover, as will be understood from the foregoing, the hologram optical element 23 functions as a combiner that directs the image light from the display device 14 and outside light simultaneously to the viewer's pupil. Thus, the viewer can view, via the hologram optical element 23, the image presented by the display device 14 and an outside world image simultaneously.

4. Fabrication Method of the Hologram Optical Element

Figure 4:
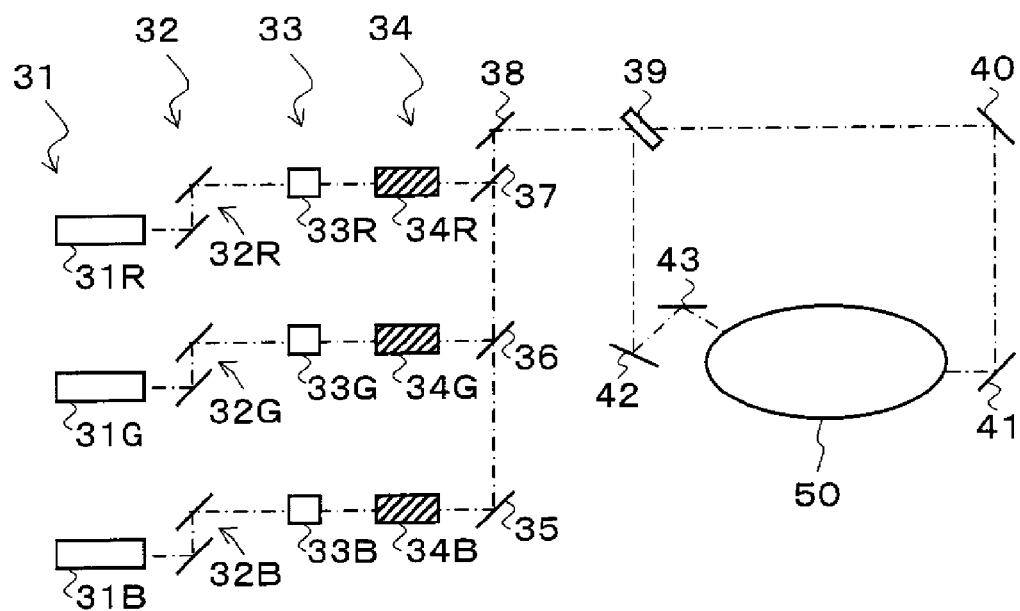
FIG. 4 is an illustrative diagram showing an outline of the construction of the entire exposure optical system used in the fabrication of the above hologram optical element.

Next, the method of fabricating the hologram optical element 23 described above will be described. FIG. 4 is an illustrative diagram showing an outline of the construction of the entire exposure optical system used in the fabrication of the hologram optical element 23. This exposure optical system includes light sources 31, beam steerers 32, shutters 33, beam expanders 34, a mirror 35, dichroic mirrors 36 and 37, a mirror 38, a beam splitter 39, mirrors 40, 41, 42, and 43, and a fabrication optical system 50.

The light sources 31 are provided one for each of R (red), G (green), and B (blue), and so are the beam steerers 32, the shutters 33, and the beam expanders 34. In the following description, wherever distinction is necessary among the optical elements for R, G, and B, their reference signs are suffixed with one of the letters R, G, and B.

In the above construction, the B laser light emitted from the light source 31B is reflected on the two mirrors constituting the beam steerer 32B, than passes through the shutter 33B, which adjusts the amount of exposure, then passes through the beam expander 34B, which enlarges the beam diameter, and is then reflected on the mirror 35 and is thereby deflected to strike the dichroic mirror 36.

Likewise, the G laser light emitted from the light source 31G is reflected on the two mirrors constituting the beam steerer 32G, than passes through the shutter 33G, which adjusts the amount of exposure, then passes through the beam expander 34G, which enlarges the beam diameter, and then strikes the dichroic mirror 36, where the G laser light is merged with the B laser light and is directed to strike the dichroic mirror 37.

Likewise, the R laser light emitted from the light source 31R is reflected on the two mirrors constituting the beam steerer 32R, than passes through the shutter 33R, which adjusts the amount of exposure, then passes through the beam expander 34R, which enlarges the beam diameter, and then strikes the dichroic mirror 37, where the R laser light is merged with the B and G laser light and is directed to strike the mirror 38.

The RGB laser light that has struck the mirror 38 is reflected thereon to strike the beam splitter 39, which splits the light into two optical paths. Along the optical path of the first exposure light beam, that is, along the optical path on the object-light side, the RGB laser light emergent from the beam splitter 39 is reflected on the mirrors 40 and 41 successively, and enters the fabrication optical system 50. On the other hand, along the optical path of the second exposure light beam, that is, along the optical path on the reference-light side, the RGB laser light emergent from the beam splitter 39 is reflected on the mirrors 42 and 43 successively, and then enters the fabrication optical system 50. Along the two RGB optical paths, the fabrication optical system 50 produces the desired exposure light beams, and shines these exposure light beams on a hologram photosensitive material 23a (see FIG. 5) and thereby fabricates the hologram optical element 23.

As the hologram photosensitive material 23a, it is possible to use a silver-halide material, gelatin dichromate, a photopolymer, or the like. Particularly preferable among these is a photopolymer, because it allows easy production of the hologram optical element 23 by a dry process.

Figure 5:
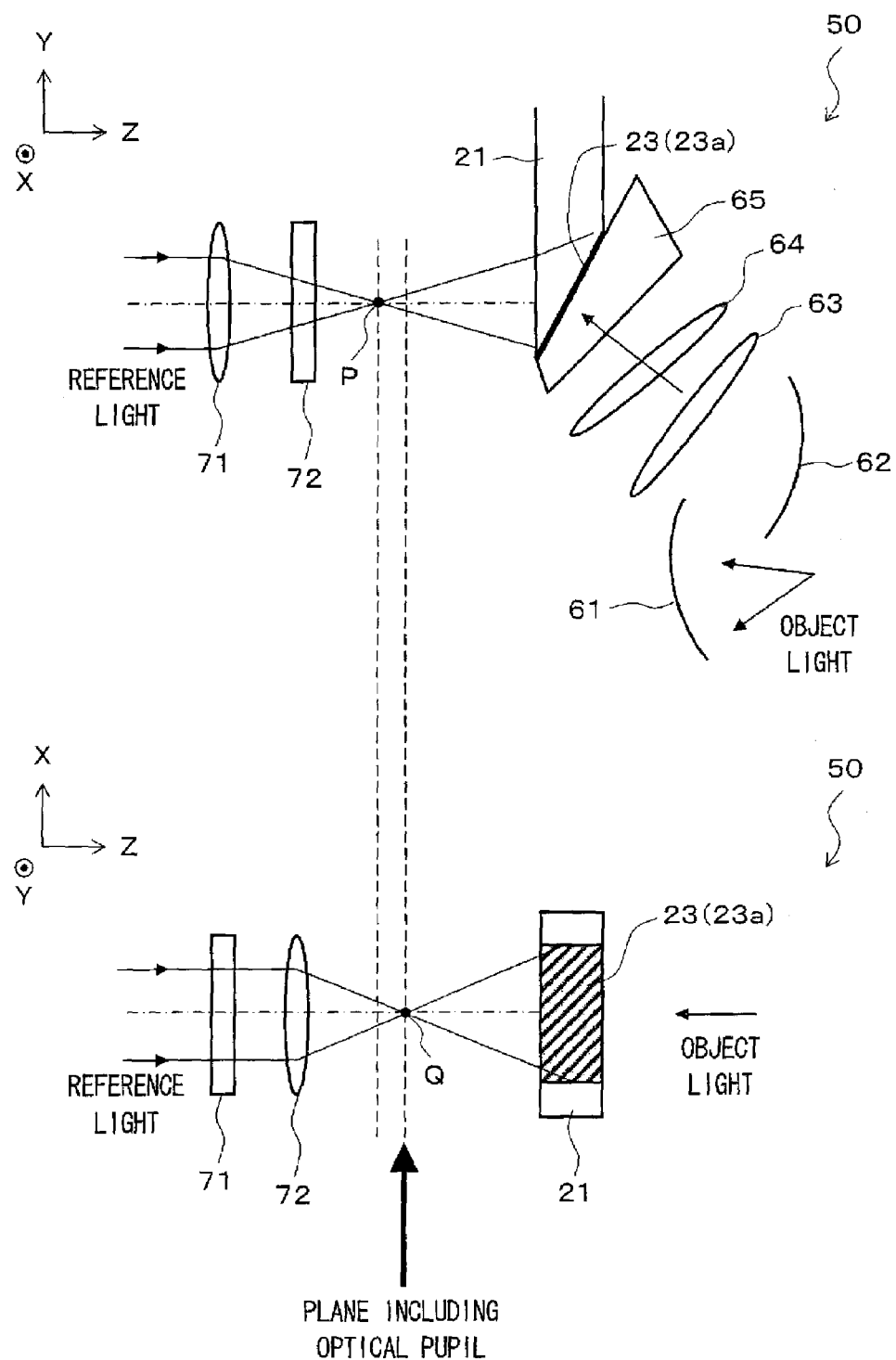
FIG. 5 is an illustrative diagram showing in detail the construction of the fabrication optical system provided within the above exposure optical system.

Next, the exposure inside the fabrication optical system 50 will be described in detail. FIG. 5 is an illustrative diagram showing in detail the construction of the fabrication optical system 50 in a form clearly showing, in particular, the optical path on the YZ-plane and the optical path on the ZX-plane.

On the object-light side, the light incident via the mirror 41 (see FIG. 4) is focused by an unillustrated focusing optical system. At its focus position, a pin hole is disposed, so that the light that has passed through the pin hole behaves as a divergent beam from an ideal point light source. The divergent beam from the point light source is reflected on reflective surfaces 61 and 62 successively, which both have an axis-asymmetric shape, is then transmitted through aspherical-surface lenses 63 and 64 successively, which are arranged axis-asymmetrically, is then transmitted through a prism 65, and then strikes the hologram photosensitive material 23a on the eyepiece prism 21, from the side thereof opposite from the eyepiece prism 21. On the other hand, on the reference-light side, the light incident via the mirror 43 (see FIG. 4) is transmitted through two cylindrical lenses 71 and 72 successively, which are arranged in the optical axis direction (the Z-direction), and then strikes the hologram photosensitive material 23a on the eyepiece prism 21, from the eyepiece prism 21 side thereof.

The hologram optical element 23 is responsible for a large part of the optical power of the complicated eyepiece optical system 4; accordingly, when it is fabricated, the hologram photosensitive material 23a needs to be exposed by use of an axis-asymmetric optical system so that the fabricated hologram optical element 23 has the function of reconstructing an axis-asymmetric wavefront. This is the reason that the optical system on the object-light side is constructed as described above so that the object light is a beam having an axis-asymmetric wavefront. In general, an axis-asymmetric optical system can be built with a lens, a prism, a DOE, a reflective surface, etc. arranged axis-asymmetrically, and is built with optical elements appropriately selected from those. As necessary, the optical system on the reference light side may also adopt a lens system having an axis-asymmetric arrangement or construction.

The two cylindrical lenses 71 and 72 arranged in the optical axis direction in the optical system on the reference-light side each focus light in a different direction. Specifically, the cylindrical lens 71 focuses incident light (here, the light incident via the mirror 43) only on the YZ-plane, and the cylindrical lens 72 focuses incident light (here, the light incident through the cylindrical lens 71) only on the ZX-plane. Arranging these two cylindrical lenses 71 and 72 apart from each other in the direction of travel of the light beam allows the focus point (the position of a point light source) at the time of exposure to be located at positions different in the optical axis direction between on the YZ-plane and on the ZX-plane. In this embodiment, the focus point Q on the ZX-plane at the time of exposure is substantially coincident with the optical pupil at the time of reconstruction, and the focus point P on the YZ-plane at the time of exposure is on the side of the optical pupil at the time of reconstruction opposite from the hologram optical element 23. Thus, by use of the cylindrical lenses 71 and 72, at the time of exposure, a light divergent from the focus point P is obtained on the YZ-plane, and a light divergent from the focus point Q is obtained on the ZX-plane.

As described above, inside the fabrication optical system 50, of the two light beams to which the hologram photosensitive material 23a is exposed, one, the first exposure light beam (object light), is a beam having an axis-asymmetric wavefront, and the other, the second exposure light beam (reference light), is a beam having, at the time of exposure, focus points P and Q different in the optical axis direction between on the YZ-plane and on the ZX-plane. Thus, when the hologram optical element 23 is fabricated by two-beam interference and is employed in the image display apparatus 1, at the time of reconstruction, the component of a predetermined wavelength of the image light (for example, the light of at least one of R, G, and B) diffracted by the hologram optical element 23 is focused at positions different in the optical axis direction on the YZ-plane and on the ZX-plane. This makes it possible to obtain different viewing characteristics between in two directions, namely the Y- and X-directions.

Figure 1:
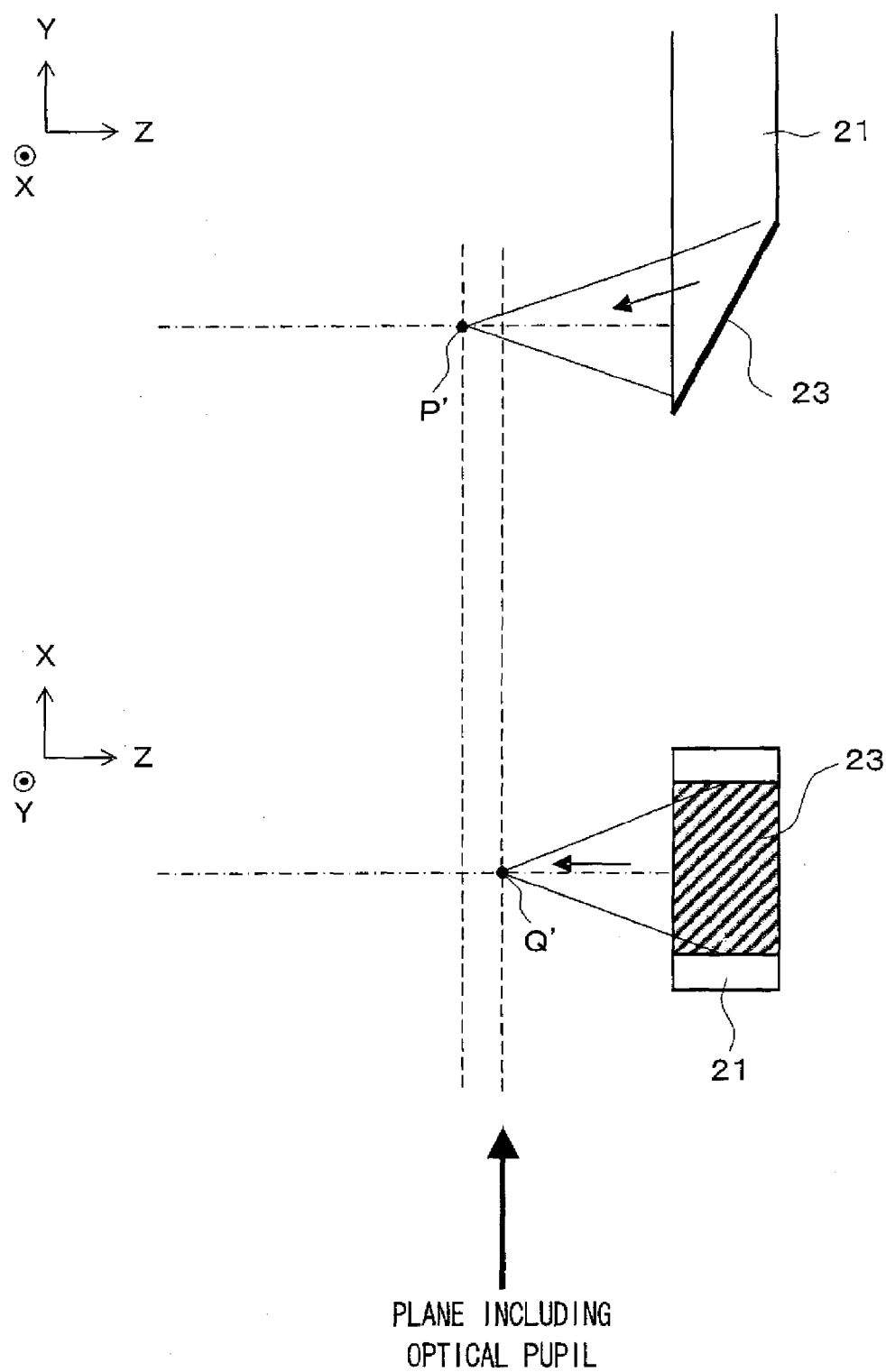
FIG. 1 is an illustrative diagram showing the focus positions of the image light diffraction-reflected by the hologram optical element at the time of reconstruction in an image display apparatus according to one embodiment of the invention.
Figure 6:
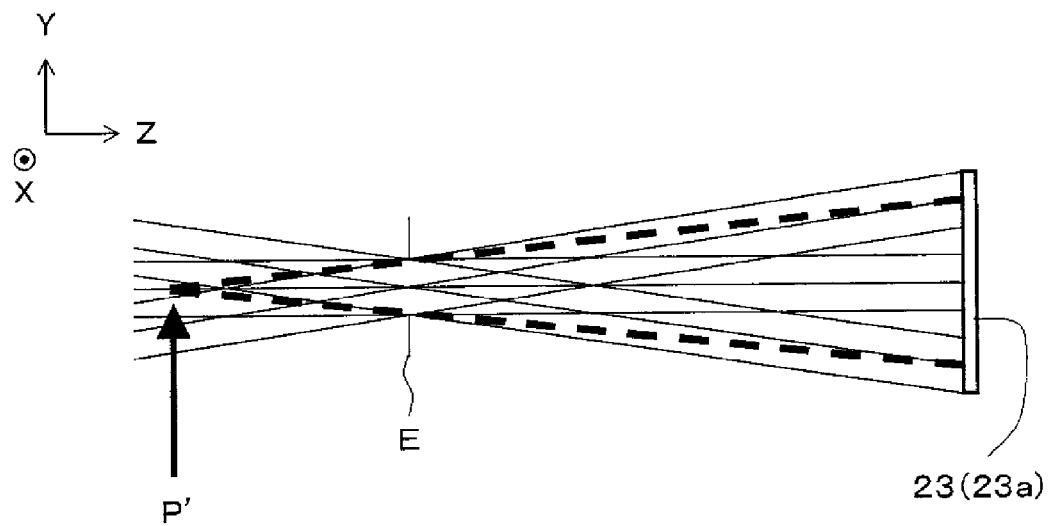
FIG. 6 is an illustrative diagram showing together the rays of the image light incident on the optical pupil at the time of reconstruction and the rays of the reference light at the time of exposure.
Figure 6:
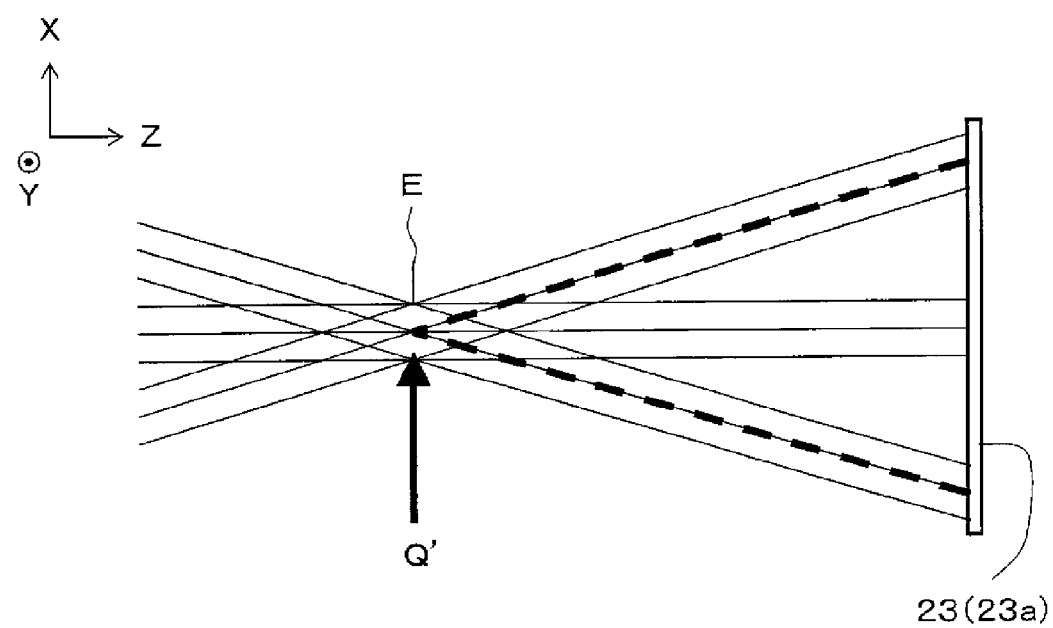

FIG. 1 is an illustrative diagram showing the focus positions, on the YZ- and ZX-planes, of the image light (for example, B light) diffraction-reflected by the hologram optical element 23 at the time of reconstruction. FIG. 6 is an illustrative diagram showing together, on each of the YZ- and ZX-planes, the rays (solid lines) of the image light (for example, B light) incident on the optical pupil at the time of reconstruction and the rays (broken lines) of the reference light (for example, B light) at the time of exposure. When the hologram optical element 23 is fabricated by use of the fabrication optical system 50 shown in FIG. 5, at the time of reconstruction, the image light diffraction-reflected by the hologram optical element 23 is focused at a focus point P' on the YZ-plane and at a focus point Q' on the ZX-plane. Here, the focus points P' and Q' are coincident with the focus points P and Q in FIG. 5.

Thus, in a case where, at the time of reconstruction, the image is viewed with the viewer's pupil located on the plane including the optical pupil E, on the YZ-plane, even when the viewer's pupil deviates within the plane including the optical pupil E, depending on the viewing direction, the viewing direction may be close to the direction from which the exposure rays are incident on the hologram photosensitive material 23a at the time of exposure (in FIG. 6, the inclination of the solid-line rays is close to the inclination of the broken-line rays), or may even be coincident with this direction of incidence. This allows reduction of color unevenness resulting from a deviation in the pupil position. On the other hand, on the ZX-plane, when the viewer views the image with no deviation in the pupil position within the plane of the optical pupil E, the direction from which the exposure rays are incident on the hologram photosensitive material 23a coincides with the direction from which the image is viewed (the solid-line rays coincide with the broken-line rays). This allows the viewer to view a satisfactory image with no color unevenness within the viewing angle.

As described above, with the method of fabricating the hologram optical element 23 according to this embodiment, by applying the hologram optical element 23 fabricated by that method to the image display apparatus 1, it is possible to give it characteristics, for example, with priority given to the pupil (for reduced color unevenness resulting from a deviation in the pupil position) in the Y-direction, i.e. the vertical direction, and with priority given to the viewing angle (for reduced color unevenness within the viewing angle) in the X-direction, i.e. the horizontal direction. In this way, it is possible to realize different viewing characteristics in different directions on a plane including the optical pupil E simultaneously, and thus it is possible to realize an image display apparatus 1 that affords enhanced usability.

Particularly to be noted is that, at the time of reconstruction, the image light is focused, on one plane (the ZX-plane), at a position (the focus point Q') substantially coincident with the optical pupil E and, on the other plane (the YZ-plane), at a position (the focus point P') on the side of the optical pupil E opposite from the hologram optical element 23. Thus, it is possible to surely design characteristics with priority given to the viewing angle in one direction (the X-direction) and with priority given to the pupil in the other direction (the Y-direction).

Moreover, by adjusting the focus positions at the time of exposure (the focus points P and Q) separately in the optical axis direction, it is possible to adjust the focus positions at the time of reconstruction (the focus points P' and Q') individually in the optical axis direction. This makes it possible to adjust the viewing characteristics at the time of reconstruction in the X- and Y-directions individually, further enhancing the usability of the apparatus.

Moreover, in this embodiment, as a result of the use of the display device 14 of which the display area is longer in the X-direction than in the Y-direction, the viewing angle with which the image is viewed at the position of the optical pupil E is larger in the X-direction (on the ZX-plane) than in the Y-direction (on the YZ-plane). In particular, in a case where, as the display device 14, one having a display area with an aspect ratio of 16 (width):9 (height) is adopted, the viewing angle is notably wider in the horizontal direction than in the vertical direction. Thus, it is desirable that color unevenness in the image in the X-direction be reduced as much as possible.

Accordingly, in this embodiment, to design characteristics with priority given to the viewing angle in the direction (the X-direction) in which the viewing angle is wider, the focus position (the focus point Q') of the component of a predetermined wavelength of the image light on whichever of the ZX- and YZ-planes offers the wider viewing angle (on the ZX-plane) is substantially coincident with the optical pupil E. That is, the viewing angle on the ZX-plane, on which the focus position of the image light at the time of reconstruction is substantially coincident with the optical pupil E, is wider than that on the other, YZ-plane. This allows the viewer to view a satisfactory image with a wider viewing angle combined with reduced color unevenness. Thus, even in a case where, as the display device 14, one capable of displaying a high-definition image of digital broadcast is used, it is possible to allow the viewer to view a satisfactory image with reduced color unevenness in the horizontal direction.

Moreover, in a case where, as in this embodiment, the supporting member 2 for supporting the image display apparatus 1 in front of the viewer's eye is held in contact with a side part of the viewer's head, the deviation in the position of the viewer's pupil in the horizontal direction is small. Thus, by aligning with the horizontal direction, of the X- and Y-directions, the one included in the plane (the ZX-plane) on which the focus position of the image light at the time of reconstruction is substantially coincident with the optical pupil E, it is possible to design characteristics with priority given to the viewing angle in the horizontal direction, and thereby to allow the viewer to view a satisfactory image with no color unevenness in the horizontal direction.

Figure 7A:
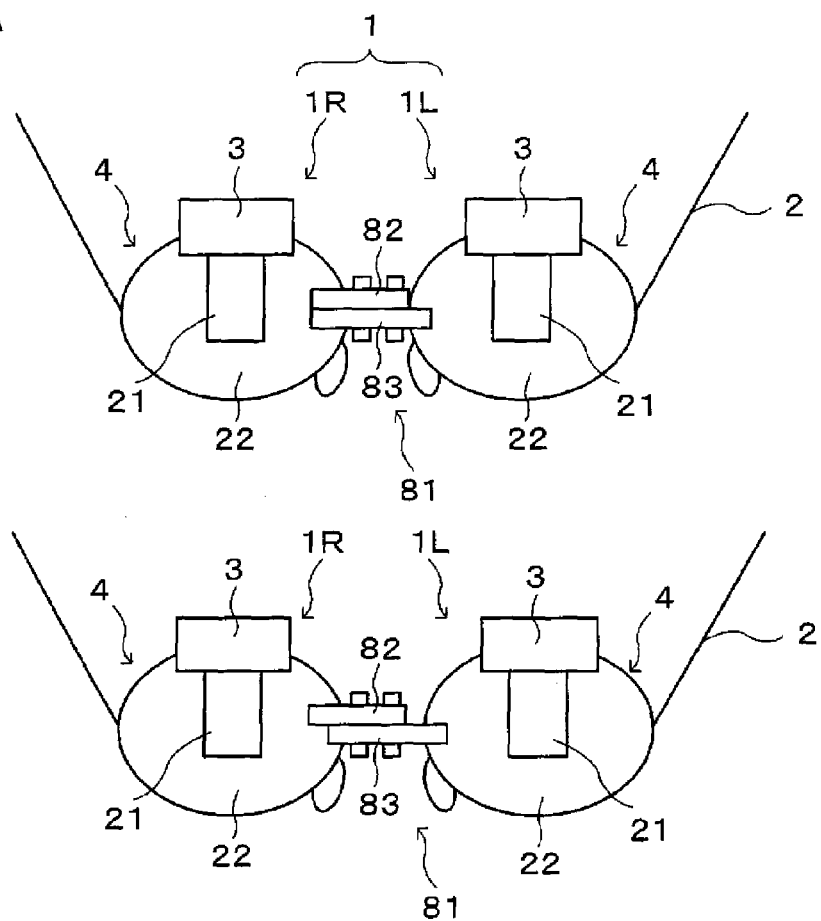
FIG. 7A is a pair of front views schematically showing an outline of the construction of image display apparatuses provided with two display units one for each of a viewer's two eyes and of HMDs incorporating the image display apparatus.

It is possible to build an image display apparatus that is single as a whole but that incorporates two of the image display apparatuses 1 described above to correspond one to each of the viewer's two eyes. Here, for the sake of convenience, the image display apparatus 1 corresponding to the viewer's right eye is called the display unit IR, the image display apparatus 1 corresponding to the viewer's left eye is called the display unit IL, and these two display units IR and IL are together dealt with as a single image display apparatus 1. FIG. 7A is a pair of front views schematically showing an outline of the construction of the image display apparatus 1, provided with two display units IR and IL one for each of the viewer's two eyes, and an HMD incorporating it.

Figure 7B:
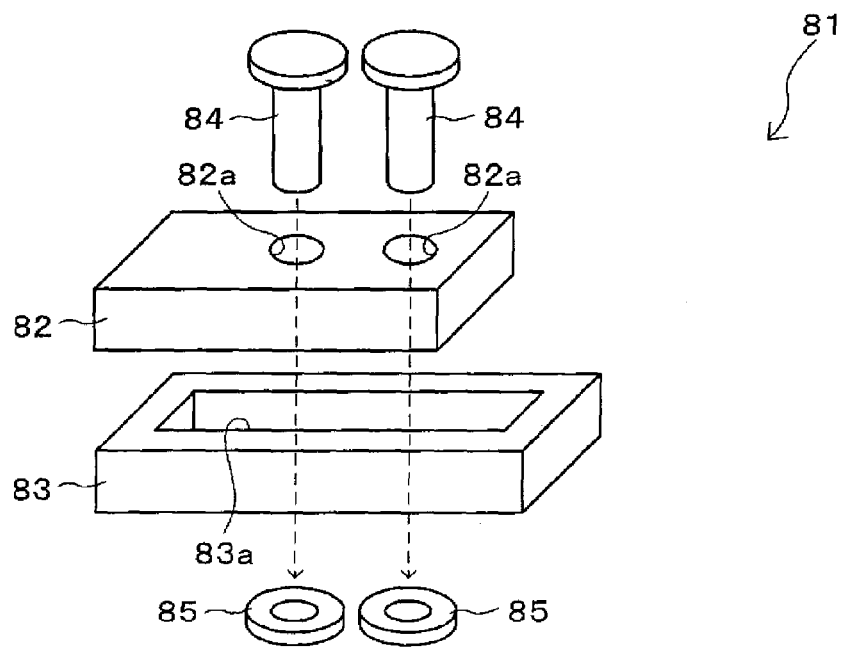
FIG. 7B is an exploded perspective view showing an outline of the structure of the adjustment mechanism provided in the above image display apparatus.

This image display apparatus 1 permits the viewer to view the images displayed by the display units IR and IL with both of his eyes respectively. To enable viewers with different pupil distances to view a satisfactory image with no color unevenness in the horizontal direction, it is preferable to provide an adjustment mechanism 81. FIG. 7B is an exploded perspective view showing an outline of the structure of the adjustment mechanism 81.

The adjustment mechanism 81 serves as an adjusting means for adjusting the distance between the two display units IR and IL in the pupil distance direction, and is composed of two sliding members 82 and 83 and, as a fixing portion (fixing means) for fixing the sliding members 82 and 83, two pairs of a bolt 84 and a nut 85.

The two sliding members 82 and 83 are plate-shaped members that slide relative to each other in the pupil distance direction while being kept in contact with each other. One end of one sliding member 82 is fixed, with a screw, adhesive, or the like, to the eyepiece optical system 4 (for example, the deflector prism 22) of the display unit IR, and the other end of this sliding member 82 is left free. One end of the other sliding member 83 is fixed, with a screw, adhesive, or the like, to the eyepiece optical system 4 (for example, the deflector prism 22) of the display unit IL, and the other end of this sliding member 83 is left free.

In the sliding member 82, two circular holes 82a penetrating from the top to the bottom surface are formed side by side in the pupil distance direction. On the other hand, in the sliding member 83, a hole 83a penetrating from the top to the bottom surface is formed. This hole 83a is a rectangular, elongate hole whose length in the pupil distance direction is greater than the distance between the holes 82a. There is no particular limitation on the shape of the hole 83a.

With this adjustment mechanism 81 structured as described above, the two sliding members 82 and 83 are slid relative to each other in the pupil distance direction, i.e. the horizontal direction, over a distance corresponding to the viewer's pupil distance, and then the bolts 84 are put through the holes 82a in the sliding member 82 and the hole 83a in the sliding member 83 and the nuts 85 are screw-engaged with their tip ends so that the sliding members 82 and 83 are fixed together. In this way, the distance between the display units IR and IL is adjusted. Thus, for viewers with different pupil distances, the display units IR and IL can be positioned in front of both of their eyes.

As described above, providing the image display apparatus 1 with the adjustment mechanism 81 makes it possible to use the image display apparatus 1 after the viewer has adjusted the distance between the display units IR and IL to fit his pupil distance. Thus, even with the image display apparatus 1 for viewing with both eyes, it is possible to allow viewers with different pupil distances to view a satisfactory image with reduced color unevenness within the viewing angle.

In particular, since the adjustment mechanism 81 is composed of two sliding members 82 and 83 and a fixing portion (bolts 84 and buts 85), it is possible to surely adjust the distance between the two display units IR and IL in the pupil distance direction.

Figure 8A:
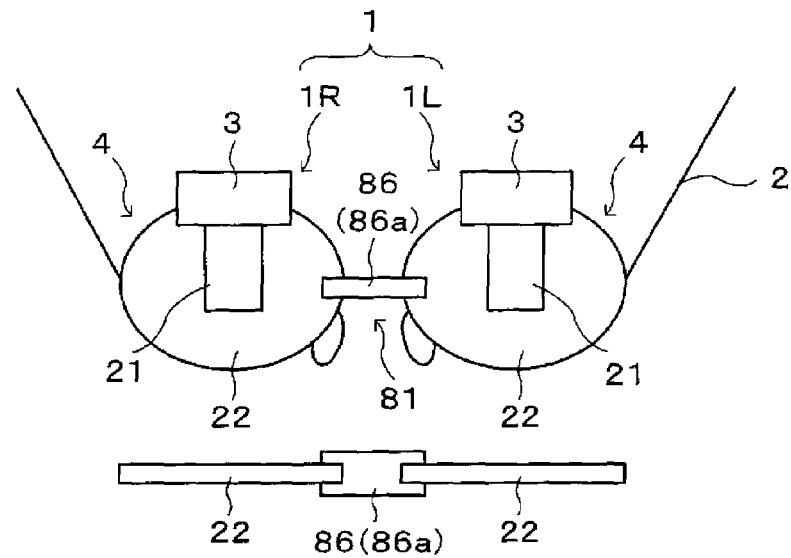
FIGS. 8A, 8B, and 8C are each a front view combined with a plan view showing different supporting members in another example of the structure of the above adjustment mechanism.
Figure 8B:
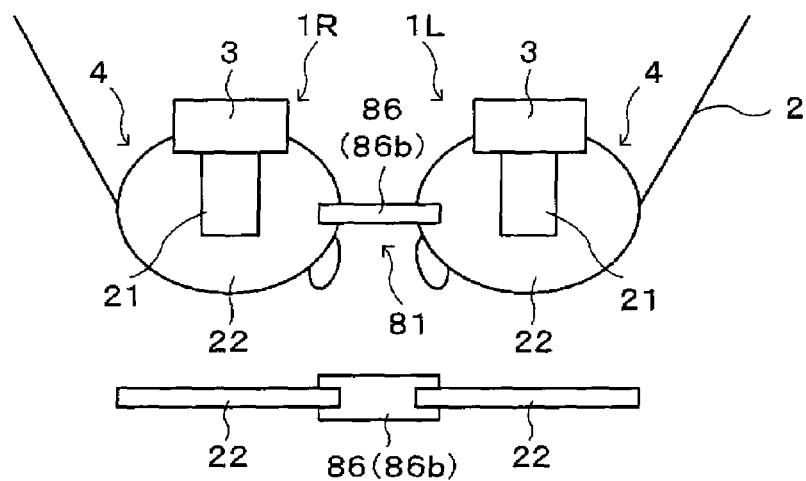
Figure 8C:
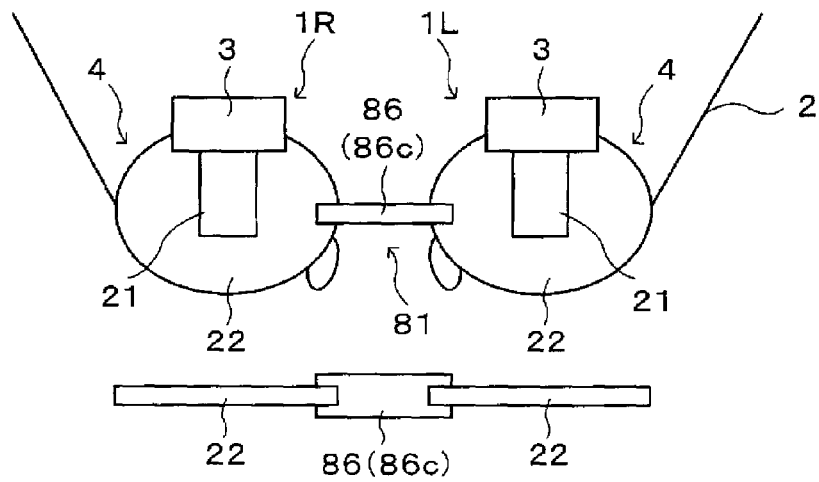

FIGS. 8A, 8B, and 8C show another example of the structure of the adjustment mechanism 81, each in a combination of a front view and a plan view. As shown in these figures, the adjustment mechanism 81 may be composed of a single supporting member 86 selected from a plurality of interchangeable supporting members 86 (second supporting members). Here, the plurality of interchangeable supporting members 86 each hold the two display units IR and IL at a predetermined distance (different from one supporting member to another), and include, for example, three supporting members 86a, 86b, and 86c. The supporting members 86a, 86b, and 86c are formed, in the order named, increasingly long in the pupil distance direction.

Both end portions of each supporting member 86 are so shaped as to be able to pinch the deflector prisms 22 of the eyepiece optical systems 4 of the display units IR and IL respectively. Instead, both end portions of each supporting member 86 may be fixed to the deflector prisms 22 with screws or the like.

As described above, using a supporting member 86 having a length corresponding to the viewer's pupil distance selected from a plurality of interchangeable supporting members 86 also makes it possible to surely adjust the distance between the two display units IR and IL in the pupil distance direction for viewers with different pupil distances. Thus, even in a case where the supporting member 86 is used as the adjustment mechanism 81, it is possible to allow the viewer to view a satisfactory image with reduced color unevenness within the viewing angle in the horizontal direction.

In a case where, as in this embodiment, a hologram optical element 23 that can handle colors, i.e. a hologram optical element 23 that diffracts RGB image light, is fabricated, the cylindrical lenses 71 and 72 used at the time of exposure may each be composed of a plurality of lenses or otherwise designed to correct chromatic aberration (to achromatize). This allows the viewer to view a more satisfactory image.

In this embodiment, a circumferential part of the circular light beam (object light and reference light) used at the time of exposure may be restricted with a light-shielding plate or the like to produce a light beam having a profile that substantially fits the shape of the hologram photosensitive material 23a (for example, a rectangular shape as shown in FIG. 5) so that the hologram photosensitive material 23a is irradiated with this light beam. This prevents the hologram photosensitive material 23a from being irradiated with light unnecessary for the formation of interference fringes (permits the hologram photosensitive material 23a to be irradiated with only the light necessary for the formation of interference fringes), and thus helps minimize the formation of unnecessary interference fringes as noise on the hologram photosensitive material 23a.

In FIG. 6, when the rays traveling, at the time of reconstruction, from the display device 14 (see FIG. 3) via the hologram optical element 23 to the center of the optical pupil E are called the principal rays, then, with respect to the light of a predetermined wavelength emergent from one point on the hologram optical element 23 at the time of reconstruction (for example, the light indicated by one of the broken lines), on the YZ-plane, the direction of emergence (indicated by the broken lines) of the light emergent from the hologram optical element 23 is different from the direction of the principal rays that travel via the same positions on the hologram optical element 23, and the light is focused near a first point (the focus point P'); on the ZX-plane, the direction of emergence of the light emergent from the hologram optical element 23 is substantially the same as the direction of the principal rays that travel via the same positions on the hologram optical element 23, and the light is focused near a second point (the focus point Q'). Here, the first point is located on the side of the second point opposite from the hologram optical element 23, and the second point is located on the plane including the optical pupil E.

Based on the foregoing, the image display apparatus 1 of this embodiment can also be expressed as follows. The image display apparatus 1 of this embodiment comprises a display device 14 and an enlargement optical system (eyepiece optical system 4) that enlarges the image formed by the display device 14 and that then directs the resulting image to a viewing pupil (optical pupil E), and the enlargement optical system comprises a volume-phase reflection hologram optical element 23 that diffraction-reflects the image light from the display device 14 toward the viewing pupil. Here, with respect to the component of a predetermined wavelength of the image light, the direction of emergence of the diffracted light on the plane (the YZ-plane) including one (the Y-direction) of two directions mutually perpendicular and perpendicular to the optical axis is different from the direction of the principal rays along the viewing optical path, and the diffracted light is focused near a first point (the focus point P'); the direction of emergence of the diffracted light on the plane (the ZX-plane) including the other (the X-direction) of the above-mentioned two directions is substantially the same as the direction of the principal rays along the viewing optical path, and the diffracted light is focused near a second point (the focus point Q'). The first point is located on the side of the second point opposite from the hologram optical element 23, and the second point is located on the plane including the optical pupil E. If the first point is regarded as a point located at infinity from the hologram optical element 23, the image display apparatus 1 described above conceptually includes the image display apparatus 1 of Embodiment 2 described below.

Embodiment 2

Another embodiment of the invention will be described below with reference to the relevant drawings. For the sake of convenience, in the following description, such parts as are found also in Embodiment 1 are identified with common reference signs, and their description will not be repeated.

Figure 9:
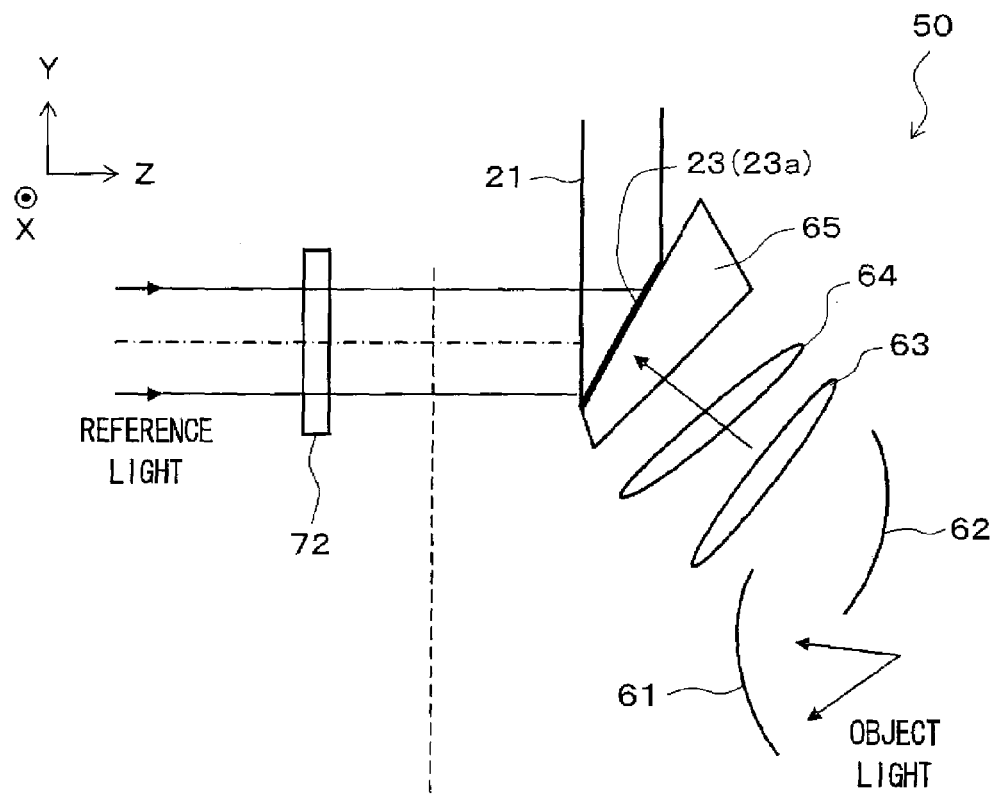
FIG. 9 is an illustrative diagram showing in detail the construction of the fabrication optical system used in the fabrication of the hologram optical element used in an image display apparatus according to another embodiment of the invention.
Figure 9:
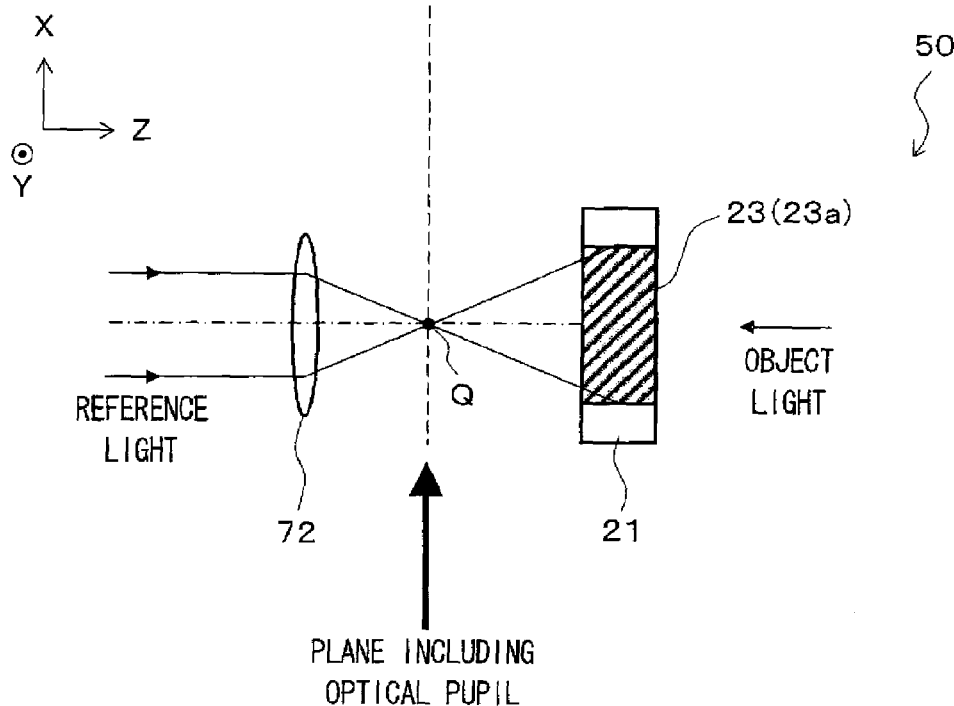

FIG. 9 is an illustrative diagram showing in detail the construction of the fabrication optical system 50 used in this embodiment in a form clearly showing, in particular, the optical path on the YZ-plane and the optical path on the ZX-plane. In this embodiment, in the optical system on the reference-light side of the fabrication optical system 50 for the exposure of the hologram photosensitive material 23a for the fabrication of the hologram optical element 23, the cylindrical lens 71 is omitted while the cylindrical lens 72 is retained. In other respects, Embodiment 2 is the same as Embodiment 1.

The cylindrical lens 72 focuses incident light (here, the light incident via the mirror 43) only on the ZX-plane. Thus, if the light incident via the mirror 43 on the cylindrical lens 72 is a substantially parallel beam, on the YZ-plane, a substantially parallel beam emerges from the cylindrical lens 72 to shine the hologram photosensitive material 23a; on the other hand, on the ZX-plane, the incident light is first focused by the cylindrical lens 72 at the focus point Q and then emerges from the focus point Q as a divergent beam to shine the hologram photosensitive material 23a.

Here, whereas the focus point Q at the time of exposure on the ZX-plane is substantially coincident with the optical pupil at the time of reconstruction, the focus point at the time of exposure on the YZ-plane is on the side of the optical pupil at the time of reconstruction opposite from the hologram optical element 23, and can therefore be regarded as located at infinity from the hologram optical element 23. Thus, also in this embodiment, where the reference light is focused only on one plane (the ZX-plane), the focus point (the position of the point light source) at the time of exposure differs in the optical axis direction between on the YZ-plane and on the ZX-plane. In this embodiment, at the time of reconstruction, the component of a predetermined wavelength of the image light diffraction-reflected by the hologram optical element 23 is focused, on the YZ-plane, at infinity and, on the ZX-plane, at a point coincident with the focus point Q.

Of the ZX- and YZ-planes, the one (the YZ-plane) on which the focus position of the component of a predetermined wavelength of the image light is located at infinity on the side of the optical pupil opposite from the hologram optical element 23, the exposure rays incident on the hologram photosensitive material 23a at the time of exposure are substantially parallel. Thus, in this embodiment, even if, at the time of reconstruction, the position of the viewer's pupil deviates in one direction (here, the Y-direction) on the just-mentioned plane, it is possible, for the viewing direction coincident with the direction of the exposure rays, to prevent color unevenness resulting from a deviation in the pupil position.

Embodiment 3

Yet another embodiment of the invention will be described below with reference to the relevant drawings. For the sake of convenience, in the following description, such parts as are found also in Embodiment 1 or 2 are identified with common reference signs, and their description will not be repeated.

Figure 10:
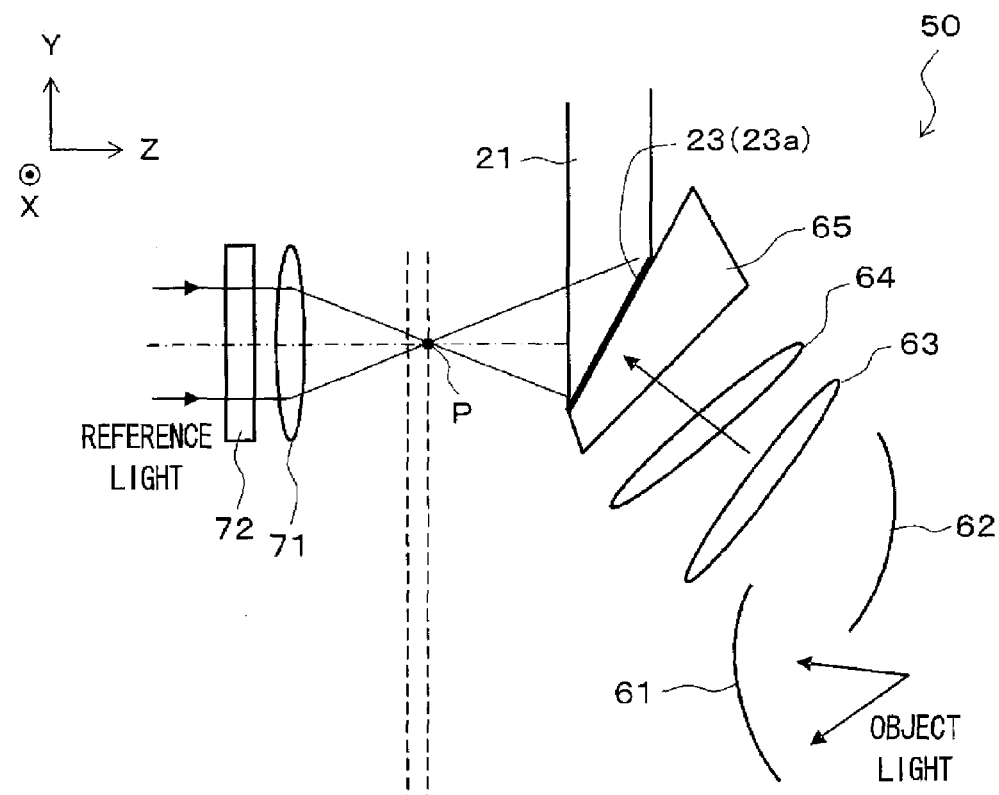
FIG. 10 is an illustrative diagram showing in detail the construction of the fabrication optical system used in the fabrication of the hologram optical element used in an image display apparatus according to yet another embodiment of the invention.
Figure 10:
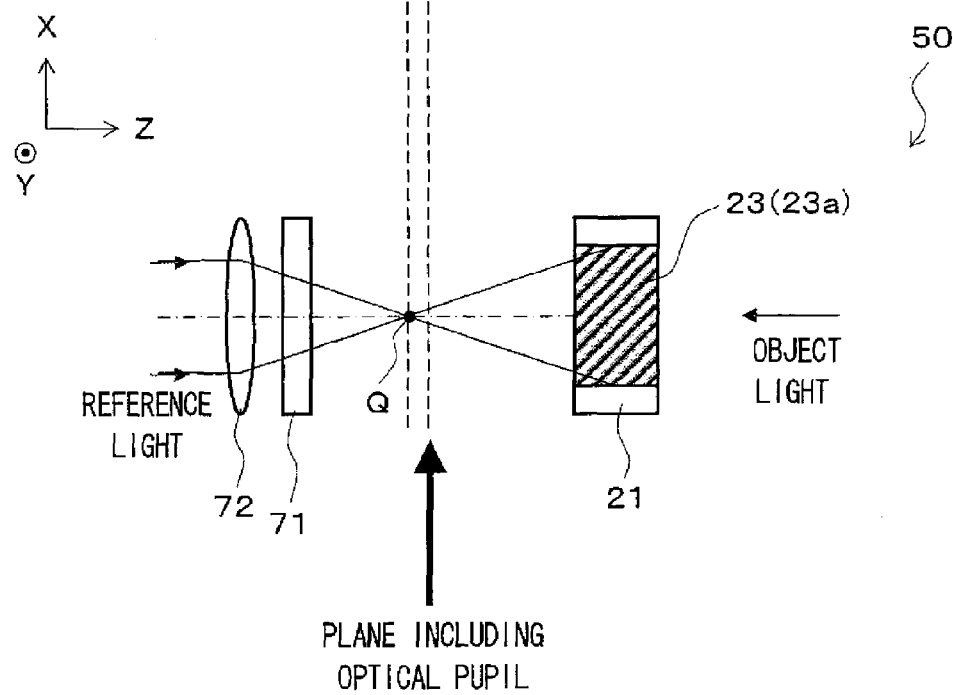

FIG. 10 is an illustrative diagram showing in detail the construction of the fabrication optical system 50 used in this embodiment in a form clearly showing, in particular, the optical path on the YZ-plane and the optical path on the ZX-plane. In this embodiment, in the optical system on the reference-light side of the fabrication optical system 50 for the exposure of the hologram photosensitive material 23a for the fabrication of the hologram optical element 23, the arrangement of the cylindrical lenses 71 and 72 is reversed; as a result, the focus position (the focus point P) on the YZ-plane at the time of exposure is substantially coincident with the optical pupil at the time of reconstruction, and the focus position (the focus point Q) on the ZX-plane at the time of exposure is on the side of the optical pupil at the time of reconstruction opposite from the hologram optical element 23. In other respects, Embodiment 3 is the same as Embodiment 1.

In this fabrication optical system 50, on the YZ-plane, the light from the mirror 43 (for example, assume it to be a parallel beam) is focused only by the cylindrical lens 71 at the focus point P, and then emerges therefrom as a divergent beam to shine the hologram photosensitive material 23a; on the other hand, on the ZX-plane, the same light is focused only by the cylindrical lens 72 at the focus point Q, and then emerges therefrom as a divergent beam to shine the hologram photosensitive material 23a.

Here, the optical pupil formed by the eyepiece optical system 4 including the hologram optical element 23 is smaller in the direction (the Y-direction) parallel to the optical-axis-incidence plane than in the direction (the X-direction) perpendicular to the optical-axis-incidence plane. Thus, the color unevenness resulting from a deviation in the pupil position in the Y-direction is tolerated to a certain degree. In view of this, it is possible to design characteristics with priority given to a characteristic other than the pupil in the Y-direction.

Accordingly, in this embodiment, of the X- and Y-directions, the one (Y-direction) included in the plane (YZ-plane) on which the focus position of the component of a predetermined wavelength of the image light at the time of reconstruction is substantially coincident with the optical pupil is aligned with the direction parallel to the optical-axis-incidence plane of the hologram optical element 23. This makes it possible to design characteristics with priority given to the viewing angle in the direction (the Y-direction) parallel to the optical-axis-incidence plane, and it is thus possible to allow the viewer to view a satisfactory image.

In a case where, in a HMD, the image display apparatus 1 is provided to correspond to one or both of the viewer's eyes, since the pupil position differs in the horizontal direction from one viewer to another (since different viewers have different pupil distances), on the same principle on which a deviation in the pupil position causes color unevenness, different viewers recognize colors differently from a predetermined viewing direction. In this embodiment, however, of the X- and Y-directions, the one (X-direction) included in the plane (ZX-plane) on which the focus position of the component of a predetermined wavelength of the image light at the time of reconstruction is on the side of the optical pupil opposite from the hologram optical element 23 coincides with the direction of the viewer's pupil distance. This makes it possible to reduce the difference in color recognition among different viewers, and thereby to allow different viewers to recognize similar colors in the same image. Another advantage is that, when an image is viewed with the image display apparatus 1 provided to correspond to both eyes, the viewer can view a satisfactory image with only a small adjustment in the pupil distance (a small adjustment of the optical axis). Thus, the construction of this embodiment is particularly effective in a case where the image display apparatus 1 is provided to correspond to both of the viewer's eyes.

In a case where the image display apparatus 1 of this embodiment is placed laterally, that is, in a case where the image display apparatus 1 is arranged with the X-direction aligned with the vertical direction and the Y-direction with the horizontal direction, it is possible to realize viewing characteristics similar to those obtained in Embodiment 1. Specifically, in the construction of this embodiment, since the focus position of the reference light on the YZ-plane at the time of exposure is substantially coincident with the optical pupil at the time of reconstruction, it is possible to design characteristics with priority given to viewing angle in the Y-direction, i.e. the horizontal direction, and with priority given to the pupil in the X-direction, i.e. the vertical direction. In this way, also by making a choice between whether to place the image display apparatus 1 longitudinally or laterally, it is possible to realize different viewing characteristics in the different directions.

In the image display apparatus 1 of this embodiment, at the time of reconstruction, with respect to the light of a predetermined wavelength emergent from one point on the hologram optical element 23, on the ZX-plane, the direction of emergence of the light emergent from the hologram optical element 23 is different from the direction of the principal rays that travel via the same positions on the hologram optical element 23, and the light is focused near a first point (coincident with the focus point Q); on the YZ-plane, the direction of emergence of the light emergent from the hologram optical element 23 is substantially the same as the direction of the principal rays that travel via the same positions on the hologram optical element 23, and the light is focused near a second point (coincident with the focus point P). Here, the first point is located on the side of the second point opposite from the hologram optical element 23, and the second point is located on the plane including the optical pupil E.

Based on the foregoing, the image display apparatus 1 of this embodiment can also be expressed as follows. The image display apparatus 1 of this embodiment comprises a display device 14 and an enlargement optical system (eyepiece optical system 4) that enlarges the image formed by the display device 14 and that then directs the resulting image to a viewing pupil (optical pupil E), and the enlargement optical system comprises a volume-phase reflection hologram optical element 23 that diffraction-reflects the image light from the display device 14 toward the viewing pupil. Here, with respect to the component of a predetermined wavelength of the image light, the direction of emergence of the diffracted light on the plane (the ZX-plane) including one (the X-direction) of two directions mutually perpendicular and perpendicular to the optical axis is different from the direction of the principal rays along the viewing optical path, and the diffracted light is focused near a first point; the direction of emergence of the diffracted light on the plane (the YZ-plane) including the other (the Y-direction) of the above-mentioned two directions is substantially the same as the direction of the principal rays along the viewing optical path, and the diffracted light is focused near a second point. The first point is located on the side of the second point opposite from the hologram optical element 23, and the second point is located on the plane including the optical pupil E. If the first point is regarded as a point located at infinity from the hologram optical element 23, the image display apparatus 1 described above conceptually includes the image display apparatus 1 of Embodiment 4 described below.

Embodiment 4

Yet another embodiment of the invention will be described below with reference to the relevant drawings. For the sake of convenience, in the following description, such parts as are found also in any of Embodiments 1 to 3 are identified with common reference signs, and their description will not be repeated.

Figure 11:
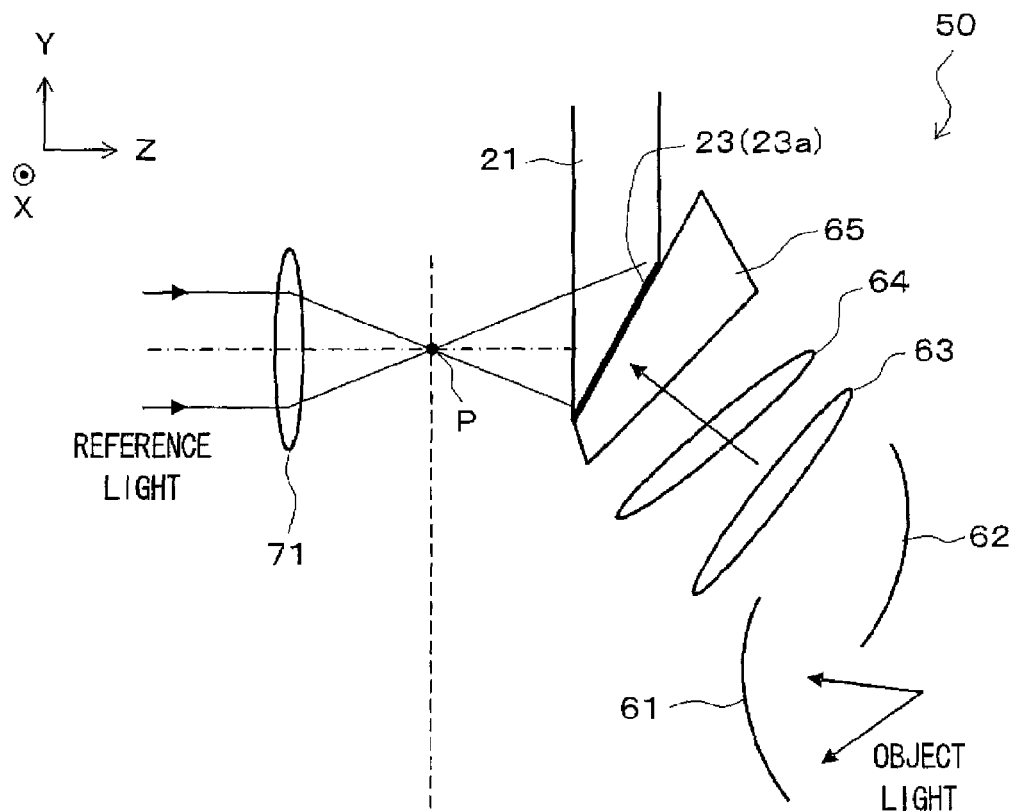
FIG. 11 is an illustrative diagram showing in detail the construction of the fabrication optical system used in the fabrication of the hologram optical element used in an image display apparatus according to yet another embodiment of the invention.
Figure 11:
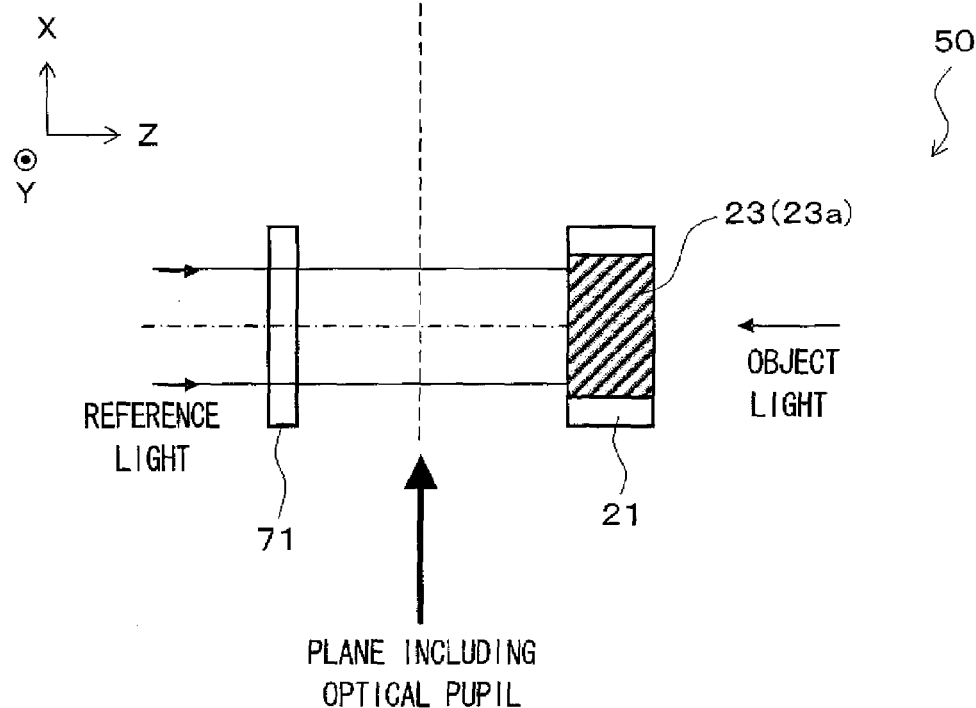

FIG. 11 is an illustrative diagram showing in detail the construction of the fabrication optical system 50 used in this embodiment in a form clearly showing, in particular, the optical path on the YZ-plane and the optical path on the ZX-plane. In this embodiment, in the optical system on the reference-light side of the fabrication optical system 50 for the exposure of the hologram photosensitive material 23a for the fabrication of the hologram optical element 23, the cylindrical lens 72 is omitted while the cylindrical lens 71 is retained. In other respects, Embodiment 4 is the same as Embodiment 3.

The cylindrical lens 71 focuses incident light (here, the light incident via the mirror 43) only on the YZ-plane. Thus, if the light incident via the mirror 43 on the cylindrical lens 71 is a substantially parallel beam, on the ZX-plane, a substantially parallel beam emerges from the cylindrical lens 71 to shine the hologram photosensitive material 23a; on the other hand, on the YZ-plane, the incident light is first focused by the cylindrical lens 71 at the focus point P and then emerges from the focus point P as a divergent beam to shine the hologram photosensitive material 23a.

Here, whereas the focus point P at the time of exposure on the YZ-plane is substantially coincident with the optical pupil at the time of reconstruction, the focus point at the time of exposure on the ZX-plane is on the side of the optical pupil at the time of reconstruction opposite from the hologram optical element 23, and can therefore be regarded as located at infinity from the hologram optical element 23. Thus, also in this embodiment, where the reference light is focused only on one plane (the YZ-plane), the focus point (the position of the point light source) at the time of exposure differs in the optical axis direction between on the YZ-plane and on the ZX-plane. In this embodiment, at the time of reconstruction, the component of a predetermined wavelength of the image light diffraction-reflected by the hologram optical element 23 is focused, on the ZX-plane, at infinity and, on the YZ-plane, at a point coincident with the focus point P.

Of the ZX- and YZ-planes, the one (the ZX-plane) on which the focus position of the component of a predetermined wavelength of the image light is located at infinity on the side of the optical pupil opposite from the hologram optical element 23, the exposure rays incident on the hologram photosensitive material 23a at the time of exposure are substantially parallel. Thus, in this embodiment, even if, at the time of reconstruction, the pupil position differs from one viewer to another in one direction (here, the X-direction) on the just-mentioned plane, it is possible, for the viewing direction coincident with the direction of the exposure rays, to reduce the difference in color recognition among different viewers, and thus it is possible to cope with use by a plurality of people with different pupil distances.

Embodiment 5

Yet another embodiment of the invention will be described below with reference to the relevant drawings. For the sake of convenience, in the following description, such parts as are found also in any of Embodiments 1 to 4 are identified with common reference signs, and their description will not be repeated.

Figure 12:
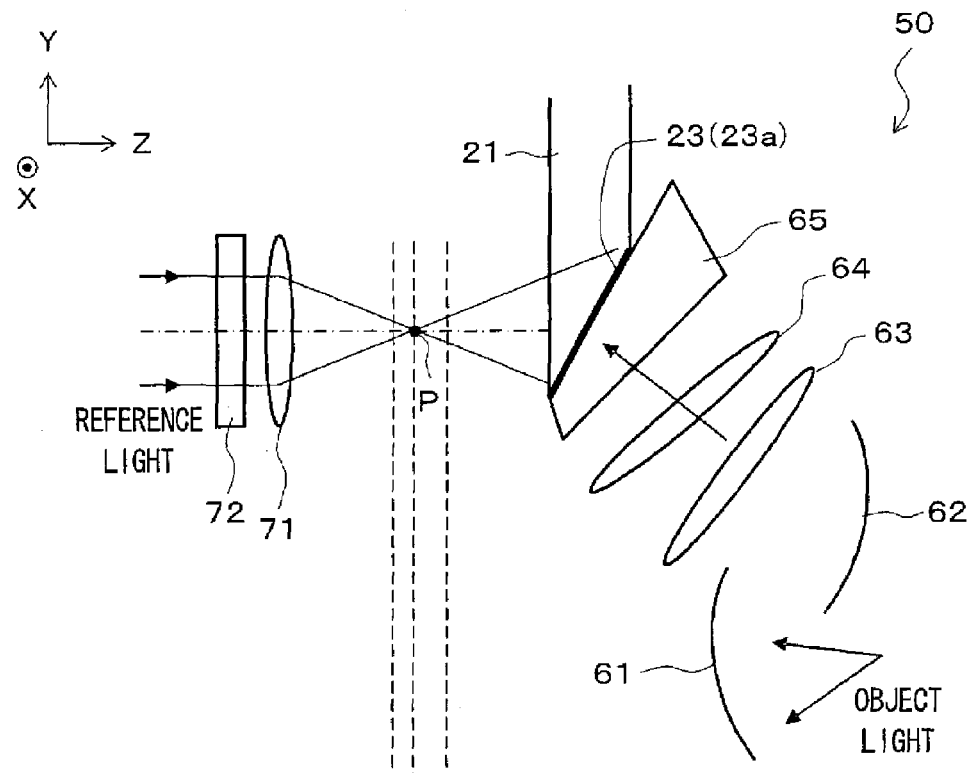
FIG. 12 is an illustrative diagram showing in detail the construction of the fabrication optical system used in the fabrication of the hologram optical element used in an image display apparatus according to yet another embodiment of the invention.
Figure 12:
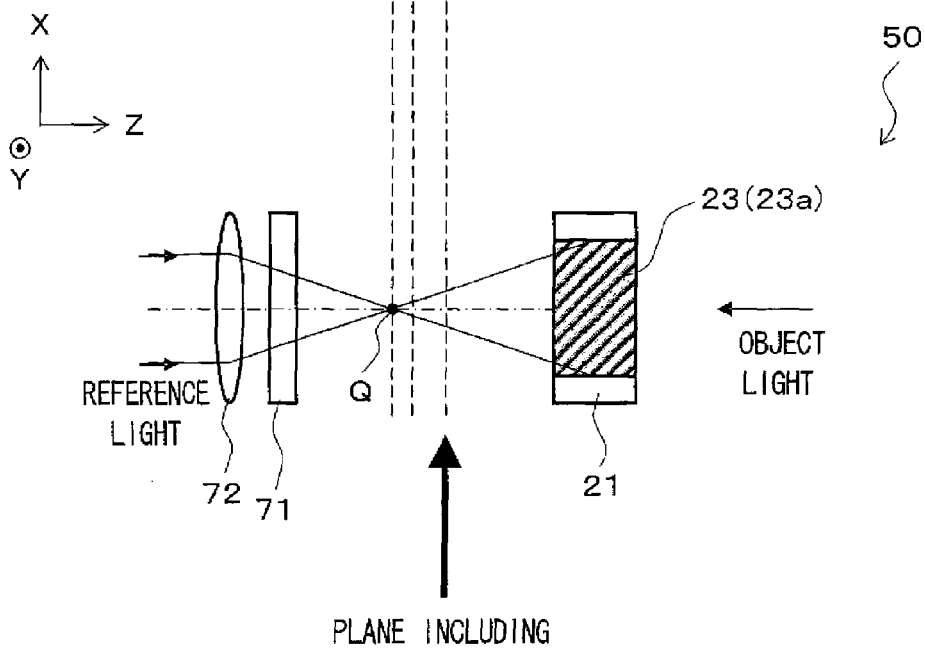

FIG. 12 is an illustrative diagram showing in detail the construction of the fabrication optical system 50 used in this embodiment in a form clearly showing, in particular, the optical path on the YZ-plane and the optical path on the ZX-plane. In this embodiment, during the exposure of the hologram photosensitive material 23a for the fabrication of the hologram optical element 23, the focus position (the focus point P) on the YZ-plane at the time of exposure is located on the side of the optical pupil at the time of reconstruction opposite from the hologram optical element 23, and the focus position (the focus point Q) on the ZX-plane is located on the side of the focus point P opposite from the hologram optical element 23. In other respects, Embodiment 5 is the same as Embodiment 3. These focus positions can be realized, for example, by shifting the cylindrical lenses 71 and 72 in the optical axis direction, or by appropriately setting the optical powers of the cylindrical lenses 71 and 72.

In this fabrication optical system 50, on the YZ-plane, the light from the mirror 43 (for example, assume it to be a parallel beam) is focused only by the cylindrical lens 71 at the focus point P, and then emerges therefrom as a divergent beam to shine the hologram photosensitive material 23a; on the other hand, on the ZX-plane, the same light is focused only by the cylindrical lens 72 at the focus point Q, and then emerges therefrom as a divergent beam to shine the hologram photosensitive material 23a. Thus, at the time of reconstruction, the component of a predetermined wavelength of the image light from the hologram optical element 23 is focused, on the YZ-plane, at a position coincident with the focus point P and, on the ZX-plane, at a position coincident with the focus point Q.

When, of the focus positions of the image light at the time of reconstruction, the one closer to the hologram optical element 23 is called the first position and the one farther away from the hologram optical element 23 is called the second position, then, in this embodiment, the focus position on the YZ-plane is the first position and the focus position on the ZX-plane is the second position.

As described above, the focus position of the component of a predetermined wavelength of the image light at the time of reconstruction is, on one (for example, the YZ-plane) of the ZX- and YZ-planes, located at the first position, i.e. on the side of the optical pupil opposite from the hologram optical element 23, and, on the other (for example, the ZX-plane) of those planes, located at the second position, i.e. on the side of the first position opposite from the hologram optical element 23. Thus, on both the ZX- and YZ-planes, the focus position of the image light differs from the optical pupil. As a result, in one (for example, the Y-direction, i.e. the vertical direction) of the X- and Y-directions, even when the viewer's pupil deviates within the optical pupil plane during the viewing of an image, it is possible to reduce the color unevenness resulting from a deviation in the pupil position, and thus it is possible to design characteristics with priority given to the pupil. On the other hand, in the other (for example, the X-direction, i.e. the horizontal direction) of those directions, even in a case where the image display apparatus 1 is used by a plurality of people with different pupil distances, it is possible to reduce the difference in color recognition among different viewers, and thus it is possible to design characteristics with priority given to the pupil distance.

In the image display apparatus 1 of this embodiment, on both the YZ- and ZX-planes, the focus positions (the first and second positions) of the component of a predetermined wavelength of the image light from the hologram optical element 23 deviate from the optical pupil in the optical axis direction. Accordingly, at the time of reconstruction, with respect to the light of a predetermined wavelength emergent from one point on the hologram optical element 23, on the YZ-plane, the direction of emergence of the light emergent from the hologram optical element 23 is different from the direction of the principal rays that travel via the same positions on the hologram optical element 23, and the light is focused near the first point (corresponding to the first position); on the ZX-plane, the direction of emergence of the light emergent from the hologram optical element 23 is different from the direction of the principal rays that travel via the same positions on the hologram optical element 23, and the light is focused near the second point (corresponding to the second position). Here, the first and second points are both located on the side of the optical pupil opposite from the hologram optical element 23, and moreover the second point is located on the side of the first point opposite from the hologram optical element 23.

Based on the foregoing, the image display apparatus 1 of this embodiment can also be expressed as follows. The image display apparatus 1 of this embodiment comprises a display device 14 and an enlargement optical system (eyepiece optical system 4) that enlarges the image formed by the display device 14 and that then directs the resulting image to a viewing pupil (optical pupil E), and the enlargement optical system comprises a volume-phase reflection hologram optical element 23 that diffraction-reflects the image light from the display device 14 toward the viewing pupil. Here, the hologram optical element 23 is so designed that, with respect to the component of a predetermined wavelength of the image light, the direction of emergence of the diffracted light on the plane (the YZ-plane) including one (the Y-direction) of two directions mutually perpendicular and perpendicular to the optical axis is different from the direction of the principal rays along the viewing optical path, and the diffracted light is focused near a first point; the direction of emergence of the diffracted light on the plane (the ZX-plane) including the other (the X-direction) of the above-mentioned two directions is different from the direction of the principal rays along the viewing optical path, and the diffracted light is focused near a second point. The first and second points are both located on the side of the optical pupil opposite from the hologram optical element 23, and moreover the second point is located on the side of the first point opposite from the hologram optical element 23. If the second point is regarded as a point located at infinity from the hologram optical element 23, the image display apparatus 1 described above conceptually includes the image display apparatus 1 of Embodiment 6 described below.

In this embodiment, the focus position of the image light on the YZ-plane is closer to the optical pupil than is the focus position of the image light on the ZX-plane. This positional relationship may be reversed, for example, by accordingly arranging the cylindrical lenses 71 and 72 and setting their optical powers. Specifically, the focus position of the image light on the ZX-plane may be located closer to the optical pupil than is the focus position of the image light on the YZ-plane. In that case, since the focus position of the image light on the ZX-plane is closer to the optical pupil, it is the first position, while the focus position of the image light on the YZ-plane is the second position. Even in this case, it is still true that the first and second positions both deviate from the optical pupil in the optical axis direction, and thus it is possible to design characteristics with priority given to the pupil in one of the X- and Y-directions and with priority given to the pupil distance on the other.

Embodiment 6

Yet another embodiment of the invention will be described below with reference to the relevant drawings. For the sake of convenience, in the following description, such parts as are found also in any of Embodiments 1 to 5 are identified with common reference signs, and their description will not be repeated.

Figure 13:
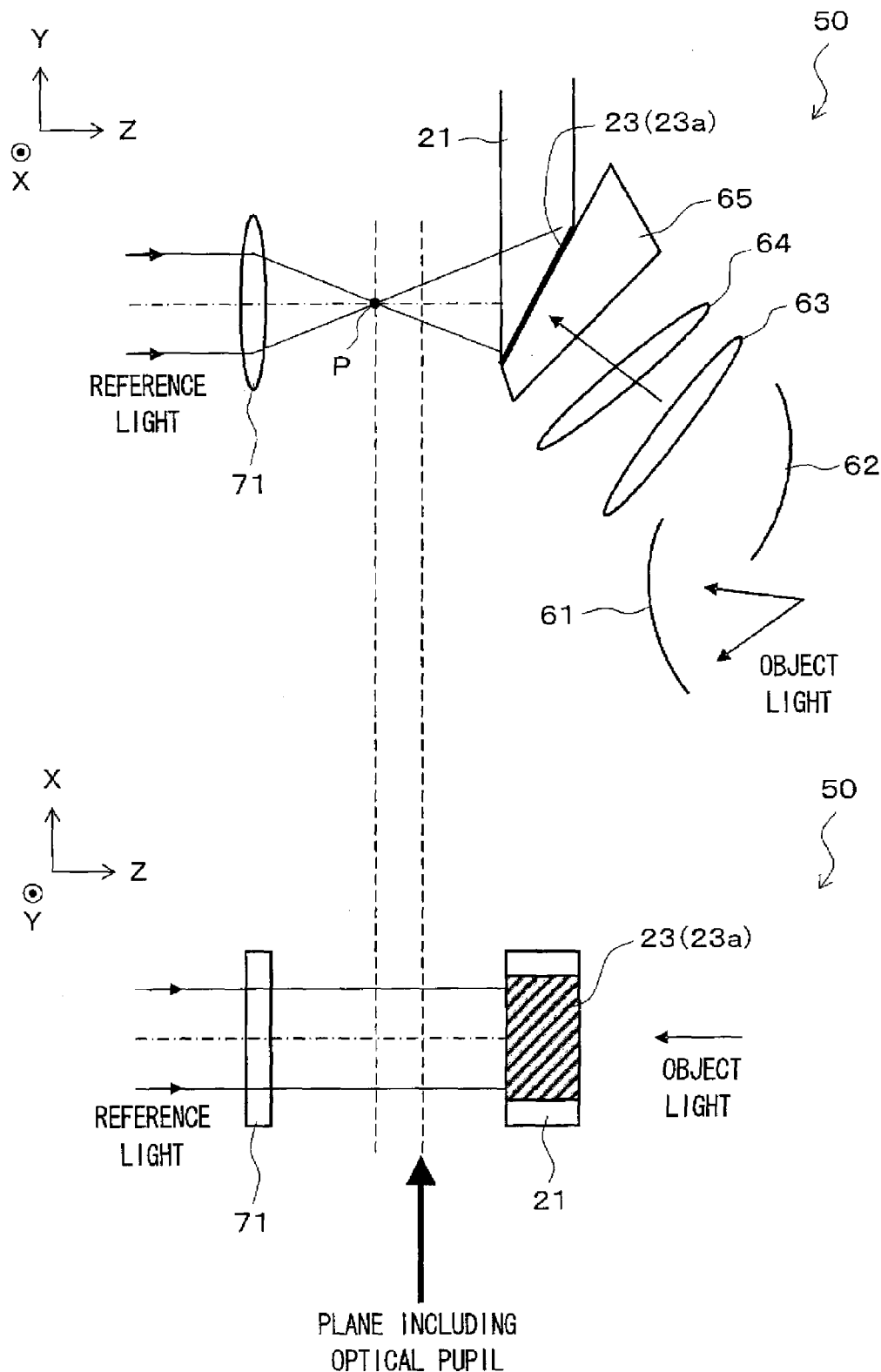
FIG. 13 is an illustrative diagram showing in detail the construction of the fabrication optical system used in the fabrication of the hologram optical element used in an image display apparatus according to yet another embodiment of the invention.
Figure 14:
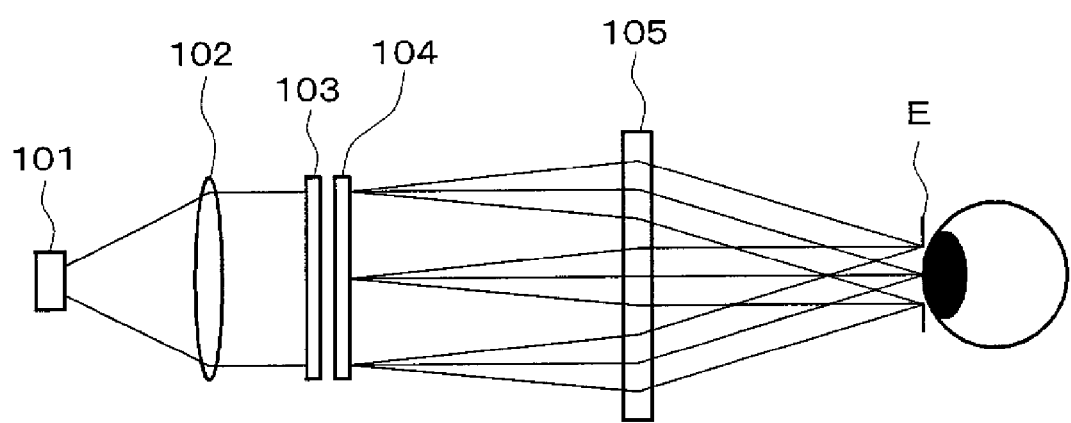
FIG. 14 is an illustrative diagram showing a conventional image display apparatus in a form with its optical path straightened.

FIG. 13 is an illustrative diagram showing in detail the construction of the fabrication optical system 50 used in this embodiment in a form clearly showing, in particular, the optical path on the YZ-plane and the optical path on the ZX-plane. In this embodiment, in the optical system on the reference-light side of the fabrication optical system 50 for the exposure of the hologram photosensitive material 23a for the fabrication of the hologram optical element 23, the cylindrical lens 72 is omitted while the cylindrical lens 71 is retained. In other respects, Embodiment 6 is the same as Embodiment 5.

The cylindrical lens 71 focuses incident light (here, the light incident via the mirror 43) only on the YZ-plane. Thus, if the light incident via the mirror 43 on the cylindrical lens 71 is a substantially parallel beam, on the ZX-plane, a substantially parallel beam emerges from the cylindrical lens 71 to shine the hologram photosensitive material 23a; on the other hand, on the YZ-plane, the incident light is first focused by the cylindrical lens 71 at the focus point P and then emerges from the focus point P as a divergent beam to shine the hologram photosensitive material 23a.

Here, the focus point P at the time of exposure on the YZ-plane is located on the side of the optical pupil at the time of reconstruction opposite from the hologram optical element 23; the focus point at the time of exposure on the ZX-plane is located on the side of the focus point P opposite from the hologram optical element 23, and can be regarded as located at infinity from the hologram optical element 23. Thus, at the time of reconstruction, the component of a predetermined wavelength of the image light diffraction-reflected by the hologram optical element 23 is focused, on the YZ-plane, at a point coincident with the focus point P and, on the ZX-plane, at infinity from the hologram optical element 23.

In this embodiment, since the focus position of the image light on the YZ-plane is closer to the optical pupil than is the focus position (at infinity) of the image light on the ZX-plane, the former focus position is the first position, and the latter focus position is the second position.

As described above, in this embodiment, the second position, i.e. the focus position of the image light on the ZX-plane, is at infinity from the hologram optical element 23. Accordingly, on the ZX-plane, the exposure rays incident on the hologram photosensitive material 23a at the time of exposure are substantially parallel. Thus, even in a case where a plurality of viewers have different pupil distances in the direction (the X-direction) included in the ZX-plane, it is possible, for the viewing direction coincident with the direction of the exposure rays, to surely avoid difference in color recognition among different viewers.

In connection with Embodiment 5 described above, it has been stated that the focus position of the image light on the ZX-plane may be located closer to the optical pupil than is the focus position of the image light on the YZ-plane. Also in this construction, by the same idea as in this embodiment, the focus position of the image light on the YZ-plane may be located at infinity from the hologram optical element 23. Specifically, it is possible, at the time of exposure, to omit one of the cylindrical lenses, namely the cylindrical lens 71 (the incident light is then focused only by the cylindrical lens 72 on the ZX-plane), so that a beam substantially parallel on the YZ-plane shines the hologram photosensitive material 23a. In this case, since the focus position of the image light on the ZX-plane is closer to the optical pupil, it is the first position, while the focus position (at infinity) of the image light on the YZ-plane is the second position. In this construction, on the YZ-plane, the exposure rays incident on the hologram photosensitive material 23a at the time of exposure are substantially parallel, and thus, even when the position of the viewer's pupil deviates in the direction (the Y-direction) within the YZ-plane during the viewing of an image, it is possible, for the viewing direction coincident with the direction of the exposure rays, to surely avoid color unevenness resulting from a deviation in the pupil position.

Needless to say, any of the features and methods described above in connection with different embodiments may be combined in any way to design a fabrication optical system 50, to fabricate a hologram optical element 23, and to build an image display apparatus 1 or HMD by employing such a hologram optical element 23.

The present invention finds applications in the fabrication of color hologram optical elements for use as a combiner in head-mounted displays (HMDs) or head-up displays (HUD) and also in image display apparatuses.

The invention can also be expressed as follows and it then offers workings and benefits as described below.

According to one aspect of the invention, an image display apparatus comprises: a display device that displays an image; and an enlargement optical system that presents a viewer with an enlarged virtual image of the image displayed by the display device. Here, the enlargement optical system has a volume-phase reflection hologram optical element that diffraction-reflects the image light from the display device to direct it to the viewer's pupil. Moreover, when the axis optically connecting between the center of the display area of the display device and the center of the optical pupil formed by the enlargement optical system is called the optical axis, two directions mutually perpendicular and perpendicular to the optical axis are called the first direction and the second direction respectively, the plane parallel to the optical axis and including the first direction is called the first plane, and the plane parallel to the optical axis and including the second direction is called the second plane, then the component of a predetermined wavelength of the image light diffraction-reflected by the hologram optical element is focused at positions different in the optical axis direction between on the first plane and on the second plane.

The component of a predetermined wavelength of the image light diffraction-reflected by the hologram optical element may be focused at a finite distance from the hologram optical element, or at an infinite distance (at infinity) from the hologram optical element.

With the above construction, the image light from the display device is diffraction-reflect by the hologram optical element provided in the enlargement optical system and is thereby directed to the viewer's pupil. Thus, at the position of the optical pupil, the viewer can view an enlarged virtual image of the image displayed by the display device. Here, the focus position of the component of a predetermined wavelength (for example, the light of at least one of R, G, and B) of the image light diffraction-reflected by the hologram optical element differs in the optical axis direction between on the first plane and on the second plane. This makes it possible to realize an image display apparatus that offers different viewing characteristics between in the first direction (for example, the horizontal or vertical direction) and in the second direction (for example, the vertical or horizontal direction).

Specifically, if the focus position of the image light is, for example, substantially coincident with the optical pupil at the time of reconstruction, when the viewer views the image (virtual image) with no deviation in the pupil position within the plane of the optical pupil, the direction from which the exposure rays are incident on the hologram photosensitive material, which is fabricated into the hologram optical element, is coincident with the direction from which the image is viewed (the viewing angles at the time of exposure and at the time of reconstruction coincide). This makes it possible to view a satisfactory image without color unevenness within the viewing angle.

On the other hand, if the focus position of the image light is, for example, on the side of the optical pupil opposite from the hologram optical element, even when the viewer's pupil deviates within the plane of the optical pupil during the viewing of the image, depending on the viewing direction, the viewing direction may be close to the direction from which the exposure rays are incident on the hologram photosensitive material at the time of exposure, or may even be coincident with this direction of incidence. This allows reduction of color unevenness resulting from a deviation in the pupil position. Moreover, even in a case where the image display apparatus is used by a plurality of people with different pupil distances, on the same principle as described above, it is possible to reduce the difference in color recognition among different viewers.

Thus, owing to the feature that the focus position of the image light differs in the optical axis direction between on the first plane and on the second plane, it is possible, for example, to design characteristics with priority given to the viewing angle (for reduced color unevenness within the viewing angle) in, of the first and second directions, the one (for example, the horizontal direction) in which a wider viewing angle is desired, and with priority given to the pupil (for reduced color unevenness resulting from a deviation in the pupil position) in the other (for example, the vertical direction) of those two directions in which the viewer's pupil is more likely to deviate. Moreover, in a case where use by a plurality of people is assumed, it is possible to design characteristics with priority given to the pupil distance (for less difference in the recognition of colors among a plurality of people) in the pupil distance direction (the horizontal direction), and to design other characteristics (with priority given to the viewing angle or the pupil) in the other direction (the vertical direction). In this way, it is possible to obtain different viewing characteristics in different directions simultaneously, and thus it is possible to realize an image display apparatus that affords enhanced usability.

In an image display apparatus according to the invention, the position at which the component of the predetermined wavelength of the image light diffraction-reflected by the hologram optical element is focused may be, on one of the first and second planes, a position substantially coincident with the optical pupil and, on the other of the first and second planes, a position on the side of the optical pupil opposite from the hologram optical element.

In this case, it is possible to design characteristics with priority given to the viewing angle in one (for example, the horizontal direction) of the first and second directions and with priority given to the pupil in the other (for example, the vertical direction). In a case where use by a plurality of people is assumed, it is possible to design characteristics with priority given to the viewing angle in one direction (for example, the vertical direction) and with priority given to the pupil distance in the other direction (for example, the horizontal direction).

In an image display apparatus according to the invention, the position at which the component of the predetermined wavelength of the image light diffraction-reflected by the hologram optical element is focused on whichever of the first and second planes has a wider viewing angle may be the position substantially coincident with the optical pupil. In this case, it is possible to design characteristics with priority given to the viewing angle in, of the first and second directions, the one in which the viewing angle is wider. This allows the viewer to view a satisfactory image with a wide viewing angle combined with reduced color unevenness.

In an image display apparatus according to the invention, when the image display apparatus is supported (so as to be positioned in front of the viewer's eye) by a supporting means disposed in contact with a side part of the viewer's head, of the first and second directions, the one included in, of the first and second planes, the one on which the component of the predetermined wavelength of the image light is focused at the position substantially coincident with the optical pupil may be the horizontal direction.

In a case where the supporting means for supporting the image display apparatus is disposed in contact with a side part of the viewer's head, the deviation in the position of the viewer's pupil in the horizontal direction is small. Thus, with the above construction, it is possible to design characteristics with priority given to the viewing angle in the horizontal direction, and thereby to allow the viewer to view a satisfactory image.

An image display apparatus according to the invention may have two display units each including a display device and an enlargement optical system as described above, the two display units corresponding one to each of the viewer's two eyes, and may further comprise an adjusting means that adjusts the distance between the two display units in the pupil-distance direction.

In this case, the viewer can use the image display apparatus after adjusting the distance between the two display units in the pupil distance direction to fit his pupil distance by manipulating the adjusting means. Thus, even in an image display apparatus for viewing with both eyes, it is possible to allow viewers with different pupil distances to view a satisfactory image with reduced color unevenness within the viewing angle.

In an image display apparatus according to the invention, the adjustment mechanism may comprise: two sliding members that slide relative to each other in the pupil-distance direction while being kept in contact with each other; and a fixing means that fixes the two sliding members. Here, one end of one of the sliding members may be fixed to one of the display units, one end of the other of the sliding members may be fixed to the other of the display units, and the two sliding members may slide relative to each other over a distance corresponding to the viewer's pupil distance and be then fixed by the fixing means.

With this construction, the two sliding members are fixed to the separate display units respectively. Thus, by sliding the two sliding members relative to each other over a distance corresponding to the viewer's pupil distance and then fixing them by the fixing means, it is possible to position the two display units in front of both eyes of viewers having varying pupil distances. Thus, by building the adjusting means with two sliding members and a fixing means in this way, it is possible to securely adjust the distance between the two display units in the pupil distance direction.

In an image display apparatus according to the invention, the adjusting means may comprise a supporting member that has a length corresponding to the viewer's pupil distance and that is selected from a plurality of interchangeable supporting members each capable of supporting the two display units at a predetermined distance from each other.

With this construction, from a plurality of interchangeable supporting members, one having a length corresponding to the viewer's pupil distance is selected and used as the adjusting means. This makes it possible to surely adjust the distance between the two display units in the pupil distance direction to fit a plurality of viewers with different pupil distances.

In an image display apparatus according to the invention, of the first and second directions, the one included in, of the first and second planes, the one on which the component of the predetermined wavelength of the image light is focused at the position substantially coincident with the optical pupil may be a direction parallel to the optical-axis-incidence plane of the hologram optical element.

The optical-axis-incidence plane of the hologram optical element denotes the plane that includes both the optical axis of the light incident on the hologram optical element and the optical axis of the light reflected therefrom. In general, the optical pupil formed by an enlargement optical system including a hologram optical element is smaller in the direction parallel to the optical-axis-incidence plane than in the direction perpendicular thereto. Thus, the color unevenness resulting from a deviation in the pupil position in the direction parallel to the optical-axis-incidence plane is tolerated to a certain degree. Accordingly, it is possible to design characteristics with priority given to the viewing angle in whichever of the first and second directions is parallel to the optical-axis-incidence plane, and thereby to allow the viewer to view a satisfactory image.

In an image display apparatus according to the invention, of the first and second directions, the one included in, of the first and second planes, the one on which the component of the predetermined wavelength of the image light is focused at the position on the side of the optical pupil opposite from the hologram optical element may be the direction of the viewer's pupil distance.

With the above construction, it is possible to reduce the color unevenness resulting from a deviation in the pupil position in the pupil distance direction. Thus, for example, even in a case where a plurality of image display apparatuses are provided to correspond to both of the viewer's eyes and are used by a plurality of people with different pupil distances, it is possible to reduce the difference in color recognition from a predetermined viewing direction among different viewers resulting from the difference in the pupil position of both eyes in the pupil distance direction among different viewers.

In an image display apparatus according to the invention, the position on the side of the optical pupil opposite from the hologram optical element and at which the component of the predetermined wavelength of the image light is focused may be at infinity from the hologram optical element.

On, of the first and second planes, the one on which the focus position of the component of a predetermined wavelength of the image light is at infinity on the side of the optical pupil opposite from the hologram optical element, the exposure rays incident on the hologram photosensitive material at the time of exposure are substantially parallel. Thus, even when the position of the viewer's pupil deviates in a direction (the first or second direction) within the just-mentioned plane, it is possible, for the viewing direction coincident with the direction of the exposure rays, to prevent color unevenness resulting from a deviation in the pupil position.

In an image display apparatus according to the invention, the position at which the component of the predetermined wavelength of the image light diffraction-reflected by the hologram optical element is focused may be, on one of the first and second planes, a first position on the side of the optical pupil opposite from the hologram optical element and, on the other of the first and second planes, a second position on the side of the first position opposite from the hologram optical element.

In this case, in one (for example, the vertical direction) of the first and second directions, even when the viewer's pupil deviates within the optical pupil plane during the viewing of an image, it is possible to reduce the color unevenness resulting from a deviation in the pupil position, and thus it is possible to design characteristics with priority given to the pupil. On the other hand, in the other (for example, the horizontal direction) of those two directions, even in a case where the image display apparatus is used by a plurality of people with different pupil distances, it is possible to reduce the difference in color recognition among different viewers, and thus it is possible to design characteristics with priority given to the pupil distance.

In an image display apparatus according to the invention, the second position may be at infinity from the hologram optical element. On, of the first and second planes, the one on which the focus position of the component of a predetermined wavelength of the image light is at the second position (infinity) on the side of the first position opposite from the hologram optical element, the exposure rays incident on the hologram photosensitive material at the time of exposure are substantially parallel. Thus, even when the position of the viewer's pupil deviates in a direction (the first or second direction) within the just-mentioned plane, or even in a case where a plurality of viewers have different pupil distances in that direction, it is possible, for the viewing direction coincident with the direction of the exposure rays, to prevent color unevenness resulting from a deviation in the pupil position, or to reduce the difference in color recognition among different viewers.

In an image display apparatus according to the invention, the hologram optical element may be a combiner that directs the image light from the display device and outside light simultaneously to the viewer's pupil. In this case, the viewer can view the image (virtual image) displayed by the display device and an outside world image simultaneously, and thus it is possible to realize an image display apparatus of a see-through type.

According to another aspect of the invention, a method of fabricating a hologram optical element comprises: forming a volume-phase reflection hologram optical element by exposing a hologram photosensitive material to two coherent light beams. Here, one of the two exposure light beams has an axis-asymmetric wavefront, and the other of the two exposure light beams has focus points different in the optical axis direction between on a plane including one of two directions mutually perpendicular on a sectional plane perpendicular to that light beam and on a plane including the other of those two directions.

Of the two exposure light beams to which the hologram photosensitive material is exposed, one has an axis-asymmetric wavefront, and the other has focus points different in the optical axis direction between on a plane including one (for example, the horizontal direction) of two directions mutually perpendicular on a sectional plane perpendicular to that light beam and on a plane including the other (for example, the vertical direction) of those two directions. The other exposure light beam like this can be obtained, for example, by disposing two cylindrical lenses in the optical path in such a way that their focusing directions are perpendicular to each other and simultaneously that they are apart from each other in the direction of travel of the light beam. This makes it possible to fabricate a hologram optical element that offers different characteristics in two directions.

Here, for example, a hologram optical element thus fabricated may be applied to an image display apparatus so constructed that the image light from a display device is diffraction-reflected by the hologram optical element to be directed to the viewer's pupil. In this case, if the focus point is substantially coincident with the optical pupil at the time of exposure, when the viewer views the image with no deviation in the pupil position within the plane of the optical pupil, the direction from which the exposure rays are incident on the hologram photosensitive material is coincident with the direction from which the image is viewed, thus it is possible to view a satisfactory image with no color unevenness within the viewing angle.

On the other hand, if the focus point is on the side of the optical pupil at the time of reconstruction opposite from the hologram optical element, even when the viewer's pupil deviates within the optical pupil plane during the viewing of the image, depending on the viewing direction, the viewing direction may be close to the direction from which the exposure rays are incident on the hologram photosensitive material at the time of exposure, or may even be coincident with this direction of incidence. This allows reduction of color unevenness resulting from a deviation in the pupil position. Moreover, even in a case where the image display apparatus is used by a plurality of people with different pupil distances, on the same principle as described above, it is possible to reduce the difference in color recognition among different viewers.

Thus, by fabricating a hologram optical element offering different characteristics in two directions, and by applying it to an image display apparatus, it is possible to design characteristics with priority given to the viewing angle in the direction (for example, in the horizontal direction) in which a wider viewing angle is desired, and with priority given to the pupil in the direction (for example, in the vertical direction) in which the viewer's pupil is more likely to deviate. Moreover, in a case where use by a plurality of people is assumed, it is possible to design characteristics with priority given to the pupil distance in the pupil distance direction (the horizontal direction), and to design other characteristics (with priority given to the viewing angle or the pupil) in the other direction (the vertical direction). In this way, it is possible to obtain different viewing characteristics in different directions simultaneously, and thus it is possible to realize an image display apparatus that affords enhanced usability.

According to yet another aspect of the invention, a hologram optical element is fabricated by the method of fabricating a hologram optical element according to the invention described above. Thus, when a hologram optical element according to the invention is applied to an image display apparatus, it is possible to realize an image display apparatus that offers different viewing characteristics in two direction, namely in the horizontal and vertical directions, and that affords enhanced usability.

An image display apparatus according to the invention can also be expressed as follows and it then offers workings and benefits similar to those described above. According to a still another aspect of the invention, an image display apparatus comprises: a display device that displays an image; and an enlargement optical system that presents a viewer with an enlarged virtual image of the image displayed by the display device. Here, the enlargement optical system comprises a volume-phase reflection hologram optical element that diffraction-reflects the image light from the display device to direct it to the viewer's pupil, and the hologram optical element is one fabricated by the fabrication method according to the invention described above.

Obviously, many modifications and variations of the present invention are possible in light of the above teachings. It is therefore to be understood that within the scope of the appended claims, the invention may be practiced other than as specifically described.

What is claimed is:

1. An image display apparatus comprising:
   a display device displaying an image; and
   an enlargement optical system presenting a viewer with an enlarged virtual image of the image displayed by the display device,
   wherein
   the enlargement optical system has a volume-phase reflection hologram optical element diffraction-reflecting image light from the display device to direct the image light to the viewer's pupil, and
   when
   an axis optically connecting between a center of a display area of the display device and a center of an optical pupil formed by the enlargement optical system is called an optical axis,
   two directions mutually perpendicular and perpendicular to the optical axis are called a first direction and a second direction respectively,
   a plane parallel to the optical axis and including the first direction at a position of the optical pupil is called a first plane, and
   a plane parallel to the optical axis and including the second direction at a position of the optical pupil is called a second plane, then
   a component of a predetermined wavelength of the image light diffraction-reflected by the hologram optical element is focused at positions different in an optical axis direction between on the first plane and on the second plane.

2. The image display apparatus according to claim 1, wherein the position at which the component of the predetermined wavelength of the image light diffraction-reflected by the hologram optical element is focused is, on one of the first and second planes, a position substantially coincident with the optical pupil and, on the other of the first and second planes, a position on a side of the optical pupil opposite from the hologram optical element.

3. The image display apparatus according to claim 2, wherein the position at which the component of the predetermined wavelength of the image light diffraction-reflected by the hologram optical element is focused on whichever of the first and second planes has a wider viewing angle is the position substantially coincident with the optical pupil.

4. The image display apparatus according to claim 2, wherein, when the image display apparatus is supported by a first supporting member disposed in contact with a side part of the viewer's head, of the first and second directions, the one included in, of the first and second planes, the one on which the component of the predetermined wavelength of the image light is focused at the position substantially coincident with the optical pupil is a horizontal direction.

5. The image display apparatus according to claim 4, the image display apparatus having two display units each including the display device and the enlargement optical system, the two display units corresponding one to each of the viewer's two eyes, the image display apparatus further comprising an adjustment mechanism adjusting a distance between the two display units in a pupil-distance direction.

6. The image display apparatus according to claim 5, wherein the adjustment mechanism comprises:

two sliding members sliding relative to each other in the pupil-distance direction while being kept in contact with each other; and a fixing portion fixing the two sliding members, one end of one of the sliding members is fixed to one of the display units, one end of the other of the sliding members is fixed to the other of the display units, and the two sliding members slide relative to each other over a distance corresponding to the viewer's pupil distance and are then fixed by the fixing portion.

7. The image display apparatus according to claim 5, wherein the adjustment mechanism comprises a second supporting member having a length corresponding to the viewer's pupil distance, the second supporting member being selected from a plurality of interchangeable second supporting members each capable of supporting the two display units at a predetermined distance from each other.

8. The image display apparatus according to claim 2, wherein, of the first and second directions, the one included in, of the first and second planes, the one on which the component of the predetermined wavelength of the image light is focused at the position substantially coincident with the optical pupil is a direction parallel to an optical-axis-incidence plane of the hologram optical element.

9. The image display apparatus according to claim 2, wherein, of the first and second directions, the one included in, of the first and second planes, the one on which the component of the predetermined wavelength of the image light is focused at the position on the side of the optical pupil opposite from the hologram optical element is a direction of the viewer's pupil distance.

10. The image display apparatus according to claim 2, wherein the position on the side of the optical pupil opposite from the hologram optical element and at which the component of the predetermined wavelength of the image light is focused is at infinity from the hologram optical element.

11. The image display apparatus according to claim 1, wherein the position at which the component of the predetermined wavelength of the image light diffraction-reflected by the hologram optical element is focused is, on one of the first and second planes, a first position on a side of the optical pupil opposite from the hologram optical element and, on the other of the first and second planes, a second position on a side of the first position opposite from the hologram optical element.

12. The image display apparatus according to claim 11, wherein the second position is at infinity from the hologram optical element.

13. The image display apparatus according to claim 1, wherein the hologram optical element is a combiner that directs the image light from the display device and outside light simultaneously to the viewer's pupil.

14. A head-mounted display comprising:

the image display apparatus according to claim 1; and a first supporting member supporting the image display apparatus in front of a viewer's eye by keeping the image display apparatus in contact with a side part of the viewer's head.

15. The head-mounted display according to claim 14, wherein, of the first and second directions, the one included in, of the first and second planes, the one on which the component of the predetermined wavelength of the image light is focused at the position substantially coincident with the optical pupil is a horizontal direction.

* * * * *